(12) United States Patent
Chau et al.

(10) Patent No.: US 7,269,212 B1
(45) Date of Patent: Sep. 11, 2007

(54) LOW-LATENCY EQUALIZATION IN MULTI-LEVEL, MULTI-LINE COMMUNICATION SYSTEMS

(75) Inventors: Pak Shing Chau, San Jose, CA (US); Haw-Jyh Liaw, Fremont, CA (US); Jun Kim, Redwood City, CA (US); Jared L. Zerbe, Woodside, CA (US)

(73) Assignee: Rambus Inc., Los Altos, CA (US)

( * ) Notice: Subject to any disclaimer, the term of this patent is extended or adjusted under 35 U.S.C. 154(b) by 64 days.

(21) Appl. No.: 09/654,643

(22) Filed: Sep. 5, 2000

(51) Int. Cl.
*H03H 7/30* (2006.01)
(52) U.S. Cl. ...................................... 375/229
(58) Field of Classification Search ................ 375/229, 375/286, 288, 264, 296, 285, 258, 234, 316, 375/295, 259, 350; 326/80, 82, 83, 84, 85, 326/86, 59, 62, 63; 365/192, 189.05; 379/288
See application file for complete search history.

(56) References Cited

U.S. PATENT DOCUMENTS

| | | | |
|---|---|---|---|
| 2,912,684 A | 11/1959 | Steele | 340/347 |
| 3,051,901 A | 8/1962 | Yaegar | 325/38 |
| 3,078,378 A | 2/1963 | Burley et al. | 307/88.5 |
| 3,267,459 A | 8/1966 | Chomicki et al. | 340/347 |
| 3,484,559 A | 12/1969 | Rigby | 179/18 |
| 3,508,076 A | 4/1970 | Winder | 307/235 |
| 3,510,585 A | 5/1970 | Stone | 325/38 |
| 3,560,856 A | 2/1971 | Hisashi | 375/292 |
| 3,569,955 A | 3/1971 | Maniere | 340/347 |
| 3,571,725 A | 3/1971 | Kaneko et al. | 328/14 |
| 3,587,088 A | 6/1971 | Franaszek | 340/347 |
| 3,648,064 A | 3/1972 | Mukai et al. | 307/213 |
| 3,697,874 A | 10/1972 | Kaneko | 325/38 A |
| 3,731,199 A | 5/1973 | Tazaki et al. | 325/38 A |
| 3,733,550 A | 5/1973 | Tazaki et al. | 325/38 A |
| 3,753,113 A | 8/1973 | Maruta et al. | 325/38 A |
| 3,754,237 A | 8/1973 | de Laage de Meux | 340/347 DD |
| 3,761,818 A | 9/1973 | Tazaki et al. | 325/38 A |
| 3,772,680 A | 11/1973 | Kawai et al. | 340/347 DD |
| 3,798,544 A | 3/1974 | Norman | 325/38 A |
| 3,832,490 A | 8/1974 | Leonard | 178/68 |
| 3,860,871 A | 1/1975 | Hinoshita et al. | 325/38 B |
| 3,876,944 A | 4/1975 | Mack et al. | 325/141 |

(Continued)

FOREIGN PATENT DOCUMENTS

DE  43 20 930 A1  1/1995

(Continued)

OTHER PUBLICATIONS

IEEE Standard 802.3ab-1999, 802.3 Supplement, Local Metropolitan Area Networks, Jul. 26, 1999.

(Continued)

*Primary Examiner*—Emmanuel Bayard
(74) *Attorney, Agent, or Firm*—Silicon Edge Law Group LLP; Arthur J. Behiel

(57) ABSTRACT

Low-latency equalization mechanisms for multi-PAM communication systems are disclosed that reduce delay and complexity in signal correction mechanisms. The equalization mechanisms tap into input signals for a multi-PAM signal driver, and compensate for attenuation along a signal transmission line, crosstalk between adjacent lines, and signal reflections due to impedance discontinuities along the line.

29 Claims, 12 Drawing Sheets

U.S. PATENT DOCUMENTS

| | | | | |
|---|---|---|---|---|
| 3,927,401 | A | 12/1975 | McIntosh | 340/347 DD |
| 3,978,284 | A | 8/1976 | Yoshino et al. | 178/69.5 R |
| 3,988,676 | A | 10/1976 | Whang | 325/38 A |
| 4,038,564 | A | 7/1977 | Hakata | 307/205 |
| 4,070,650 | A | 1/1978 | Ohashi et al. | 340/172 |
| 4,086,587 | A | 4/1978 | Lender | 340/347 DD |
| 4,097,859 | A | 6/1978 | Looschen | 340/347 DD |
| 4,131,761 | A | 12/1978 | Giusto | 179/15 BY |
| RE30,182 | E | 12/1979 | Howson | 325/42 |
| 4,181,865 | A | 1/1980 | Kohyama | 307/361 |
| 4,280,221 | A | 7/1981 | Chun et al. | 375/17 |
| 4,373,152 | A | 2/1983 | Jacobsthal | 340/347 |
| 4,382,249 | A | 5/1983 | Jacobsthal | 340/347 DD |
| 4,403,330 | A | 9/1983 | Meyer | 375/4 |
| 4,408,135 | A | 10/1983 | Yuyama et al. | 307/474 |
| 4,408,189 | A | 10/1983 | Betts et al. | 340/347 DD |
| 4,438,491 | A | 3/1984 | Constant | 364/200 |
| 4,481,625 | A | 11/1984 | Roberts et al. | 370/85 |
| 4,528,550 | A | 7/1985 | Graves et al. | 340/347 DD |
| 4,571,735 | A | 2/1986 | Furse | 375/20 |
| 4,602,374 | A | 7/1986 | Nakamura et al. | 375/17 |
| 4,620,188 | A | 10/1986 | Sengchanh | 340/825.87 |
| 4,628,297 | A | 12/1986 | Mita et al. | 340/347 DD |
| 4,748,637 | A | 5/1988 | Bishop et al. | 375/7 |
| 4,779,073 | A | 10/1988 | Iketani | 341/55 |
| 4,805,190 | A | 2/1989 | Jaffre et al. | 375/17 |
| 4,821,286 | A | 4/1989 | Graczyk et al. | 375/4 |
| 4,823,028 | A | 4/1989 | Lloyd | 307/355 |
| 4,825,450 | A | 4/1989 | Herzog | 375/17 |
| 4,841,301 | A | 6/1989 | Ichihara | 341/126 |
| 4,860,309 | A | 8/1989 | Costello | 375/17 |
| 4,875,049 | A | 10/1989 | Yoshida | 341/159 |
| 4,888,764 | A | 12/1989 | Haug | 370/85.1 |
| 5,003,555 | A | 3/1991 | Bergmans | 375/12 |
| 5,023,488 | A | 6/1991 | Gunning | 307/475 |
| 5,023,841 | A | 6/1991 | Akrout et al. | 365/205 |
| 5,045,728 | A | 9/1991 | Crafts | 307/475 |
| 5,046,050 | A | 9/1991 | Kertis | 365/208 |
| 5,115,450 | A | 5/1992 | Arcuri | 375/7 |
| 5,121,411 | A | 6/1992 | Fluharty | 375/20 |
| 5,126,974 | A | 6/1992 | Sasaki et al. | 365/207 |
| 5,153,459 | A | 10/1992 | Park et al. | 307/452 |
| 5,172,338 | A | 12/1992 | Mehrotra et al. | 365/185 |
| 5,191,330 | A | 3/1993 | Fisher et al. | 341/56 |
| 5,194,765 | A | 3/1993 | Dunlop et al. | 307/443 |
| 5,230,008 | A | 7/1993 | Duch et al. | 375/19 |
| 5,243,625 | A | 9/1993 | Verbakel et al. | 375/17 |
| 5,254,883 | A | 10/1993 | Horowitz et al. | 307/443 |
| 5,259,002 | A | 11/1993 | Carlstedt | 375/38 |
| 5,280,500 | A | 1/1994 | Mazzola et al. | 375/17 |
| 5,287,108 | A | 2/1994 | Mayes et al. | 341/156 |
| 5,295,155 | A | 3/1994 | Gersbach et al. | 375/4 |
| 5,295,157 | A | 3/1994 | Suzuki et al. | 375/11 |
| 5,315,175 | A | 5/1994 | Langner | 307/443 |
| 5,331,320 | A | 7/1994 | Cideciyan et al. | 341/56 |
| 5,335,207 | A * | 8/1994 | Takamoto | 365/233.5 |
| 5,373,473 | A | 12/1994 | Okumura | 365/208 |
| 5,408,498 | A | 4/1995 | Yoshida | 375/286 |
| 5,412,689 | A | 5/1995 | Chan et al. | 375/288 |
| 5,425,056 | A | 6/1995 | Maroun et al. | 375/316 |
| 5,426,739 | A | 6/1995 | Lin et al. | 395/325 |
| 5,438,593 | A | 8/1995 | Karam et al. | 375/317 |
| 5,459,749 | A | 10/1995 | Park | 375/286 |
| 5,471,156 | A | 11/1995 | Kim et al. | 326/60 |
| 5,473,635 | A | 12/1995 | Chevroulet | 375/287 |
| 5,483,110 | A | 1/1996 | Koide et al. | 307/147 |
| 5,508,570 | A | 4/1996 | Laber et al. | 327/563 |
| 5,513,327 | A | 4/1996 | Farmwald et al. | 395/309 |
| 5,525,983 | A | 6/1996 | Patel et al. | 341/57 |
| 5,534,795 | A | 7/1996 | Wert et al. | 326/81 |
| 5,534,798 | A | 7/1996 | Phillips et al. | 326/108 |
| 5,539,774 | A | 7/1996 | Nobakht et al. | 375/232 |
| 5,546,042 | A | 8/1996 | Tedrow et al. | 327/538 |
| 5,553,097 | A | 9/1996 | Dagher | 375/240 |
| 5,596,439 | A | 1/1997 | Dankberg et al. | 359/161 |
| 5,608,755 | A | 3/1997 | Rakib | 375/219 |
| 5,640,605 | A | 6/1997 | Johnson et al. | 395/881 |
| 5,644,253 | A | 7/1997 | Takatsu | 326/35 |
| 5,663,631 | A | 9/1997 | Kajiura et al. | 322/29 |
| 5,663,663 | A | 9/1997 | Cao et al. | 326/81 |
| 5,684,833 | A | 11/1997 | Watanabe | 375/286 |
| 5,694,424 | A | 12/1997 | Ariyavisitakul | 375/233 |
| 5,699,386 | A * | 12/1997 | Measor et al. | 375/350 |
| 5,734,294 | A | 3/1998 | Bezzam et al. | 327/552 |
| 5,740,201 | A | 4/1998 | Hui | 375/286 |
| 5,742,591 | A | 4/1998 | Himayat et al. | 370/286 |
| 5,751,168 | A | 5/1998 | Speed, III et al. | 326/83 |
| 5,757,712 | A | 5/1998 | Nagel et al. | 365/226 |
| 5,761,246 | A | 6/1998 | Cao et al. | 375/287 |
| 5,793,815 | A | 8/1998 | Goodnow et al. | 375/286 |
| 5,793,816 | A | 8/1998 | Hui | 375/286 |
| 5,796,781 | A * | 8/1998 | DeAndrea et al. | 375/288 |
| 5,809,033 | A | 9/1998 | Turner et al. | 370/522 |
| 5,825,825 | A | 10/1998 | Altmann et al. | 375/293 |
| 5,835,440 | A * | 11/1998 | Manning | 365/230.06 |
| 5,864,506 | A * | 1/1999 | Arcoleo et al. | 365/189.05 |
| 5,864,584 | A | 1/1999 | Cao et al. | 375/244 |
| 5,867,010 | A | 2/1999 | Hinedi et al. | 323/282 |
| 5,872,468 | A | 2/1999 | Dyke | 327/72 |
| 5,887,032 | A | 3/1999 | Cioffi | 375/257 |
| 5,892,466 | A | 4/1999 | Walker | 341/57 |
| 5,898,734 | A | 4/1999 | Nakamura et al. | 375/287 |
| 5,917,340 | A | 6/1999 | Manohar et al. | 326/82 |
| 5,917,856 | A | 6/1999 | Torsti | 375/231 |
| 5,933,458 | A | 8/1999 | Leurent et al. | 375/317 |
| 5,942,994 | A | 8/1999 | Lewiner et al. | 341/56 |
| 5,946,355 | A | 8/1999 | Baker | 375/286 |
| 5,949,280 | A | 9/1999 | Sasaki | 329/303 |
| 5,969,579 | A | 10/1999 | Hartke et al. | 332/116 |
| 5,969,648 | A | 10/1999 | Garnett | 341/56 |
| 5,970,088 | A | 10/1999 | Chen | 375/222 |
| 5,973,508 | A | 10/1999 | Nowak et al. | 326/81 |
| 5,977,798 | A | 11/1999 | Zerbe | 329/98 |
| 5,982,741 | A | 11/1999 | Ethier | 370/201 |
| 5,986,472 | A | 11/1999 | Hinedi et al. | 326/68 |
| 6,005,895 | A | 12/1999 | Perino et al. | 375/288 |
| 6,009,120 | A | 12/1999 | Nobakht | 375/229 |
| 6,018,550 | A | 1/2000 | Emma et al. | 375/317 |
| 6,034,993 | A | 3/2000 | Norrel et al. | 375/232 |
| 6,038,260 | A | 3/2000 | Emma et al. | 375/259 |
| 6,048,931 | A | 4/2000 | Fujita et al. | 525/67 |
| 6,049,229 | A | 4/2000 | Manohar et al. | 326/83 |
| 6,052,390 | A | 4/2000 | Deliot et al. | 370/258 |
| 6,061,395 | A | 5/2000 | Tonami | 375/232 |
| 6,067,319 | A | 5/2000 | Copeland | 375/232 |
| 6,067,326 | A | 5/2000 | Jonsson et al. | 375/286 |
| 6,078,627 | A | 6/2000 | Crayford | 375/286 |
| 6,094,075 | A | 7/2000 | Garrett, Jr. et al. | 327/108 |
| 6,094,461 | A | 7/2000 | Heron | 375/317 |
| 6,097,215 | A | 8/2000 | Bialas, Jr. et al. | 326/68 |
| 6,101,223 | A | 8/2000 | Betts | 375/261 |
| 6,101,561 | A | 8/2000 | Beers et al. | 710/66 |
| 6,114,979 | A | 9/2000 | Kim | 341/57 |
| 6,122,010 | A | 9/2000 | Emelko | 348/461 |
| 6,140,841 | A | 10/2000 | Suh | 326/60 |
| 6,160,421 | A | 12/2000 | Barna | 326/63 |
| 6,195,397 | B1 | 2/2001 | Kwon | 375/288 |
| 6,222,380 | B1 | 4/2001 | Gerowitz et al. | 326/38 |
| 6,222,782 | B1 * | 4/2001 | Chon | 365/189.09 |
| 6,307,824 | B1 | 10/2001 | Kuroda et al. | 369/53.11 |
| 6,414,890 | B2 * | 7/2002 | Arimoto et al. | 365/201 |

| | | | |
|---|---|---|---|
| 6,707,727 B2 * | 3/2004 | Tamura et al. | 365/192 |
| 6,812,872 B1 | 11/2004 | Lu | |

FOREIGN PATENT DOCUMENTS

| | | |
|---|---|---|
| EP | 0 094 624 A2 | 11/1983 |
| EP | 0 352 869 A2 | 1/1990 |
| EP | 0 482 392 A2 | 10/1991 |
| EP | 0 463 316 A1 | 2/1992 |
| EP | 0 490 504 A2 | 6/1992 |
| JP | 54051343 A | 4/1979 |
| JP | 54060850 A | 5/1979 |
| JP | 56164650 A | 12/1981 |
| JP | 58-54412 A | 3/1983 |
| JP | 58070662 A | 4/1983 |
| JP | 59036465 A | 2/1984 |
| JP | 60087551 A | 5/1985 |
| JP | 60194647 A | 10/1985 |
| JP | 62051329 A | 3/1987 |
| JP | 02128201 A | 5/1990 |
| JP | 02140676 A | 5/1990 |
| JP | 04044691 A | 2/1992 |
| JP | 05143211 A | 6/1993 |
| JP | 08202677 A | 8/1996 |
| JP | 08286943 A | 11/1996 |
| JP | 09181778 A | 7/1997 |
| JP | 10200345 A | 7/1998 |
| WO | WO95/31867 | 11/1995 |
| WO | WO96/31038 A1 | 10/1996 |
| WO | WO98/33306 | 7/1998 |
| WO | WO99/10982 | 3/1999 |

OTHER PUBLICATIONS 802.3ab, A Tutorial Presentation, 63 pages, undated, believed by applicants to have been presented at an IEEE 802.3 working group meeting in Mar. 1998.
How 1000BASE-T Works, Geoff Thompson, IEEE802.3 Plenary, Nov. 13, 1997, Montreal PQ Canada, 8 pages.
A differential Error Reference Adaptive Echo Canceller for Multi-level PAM Line Codes, Perez-Alvarez et al. 0-7803-3192-3/96 © 96 IEEE, pp. 1707-1710.
A Gigabit Transceiver Chip Set for UTP CAT6 Cables in Digital CMOS Technology, Azadet et al., 2000 IEEE International Solid State Circuits Conference, pp. 306-307.
A Scalable 32Gb/s Parallel Data Transceiver with On-chip Timing Calibration Circuits, Yang et al., 2000 IEEE International Solid State Cricuits Conference, pp. 258-259.
Modulation schemes for high bit rate data transmission in the loop plant, URL-http://www.bib.fh-lippe.de/volltext/dipl/schlegel/chapter4.html, 29 pages, printed Apr. 19, 2001.
U.S. Appl. No. 09/770,406, filed Jan. 29, 2001, Hedburg.
U.S. Appl. No. 09/745,988, filed Dec. 21, 2000, Bonneau et al.
U.S. Appl. No. 09/858,760, filed May 15, 2001, Azazzi et al.
U.S. Appl. No. 09/201,114, filed Sep. 11, 2001, Hasegawa et al.
U.S. Appl. No. 09/795,811, filed Sep. 13, 2001, Govindarajan et al.
Kuczynski et al., "A 1 Mb/s Digital Subscriber Line Transceiver Signal Processor", 1993 IEEE International Solid State Circuit Conference.
S. D. Cova et al., "Characterization of Individual Weights in Transversal Filters and Application to CCD's" IEEE Journal of Solid-State Circuits, vol. SC-17, No. 6, Dec. 1982.
Dally et al., "Multi-Gigabit Signaling with CMOS", May 12, 1997.
A. Fiedler et al., "A 1.0625Gbps Transceiver with 2x-Oversampling and Transmit Signal Pre-Emphasis", 1997 IEEE International Solid State Circuit Conference and Slideset.
Raghavan, S.A. et al. "Nonuniformly Spaced Tapped-Delay-Line Equalizers," IEEE Transactions on Communications, vol. 41, No. 9, Sep. 1993, pp. 1290-1295.
Ariyavisitakul, Sirikiat et al. "Reduced-Complexity Equalization Techniques for Broadband Wireless Channels," IEEE Journal on Selected Areas in Communications, vol. 15, No. 1, Jan. 1997, pp. 5-15.

Sidiropoulos, Stefanos et al. "A 700-Mb/s/pin CMOS Signaling Interface Using Current Integrating Receivers," IEEE Journal of Solid-State Circuits, vol. 32, No. 5, May 1997, pp. 681-690.
IBM, Disclosure entitled, "Servo Control of Analog Power Supplies Purpose Interface Card", Apr. 1, 1993, vol. 36, Issue 4, pp. 283-286.
Sidiropoulos, Stefanos, et al. "A 700 Mb/s/pin CMOS Signaling Interface Using Current Integrating Receivers", IEEE Journal of Solid-State Circuits; vol. 32, No. 5, May 1997; pp. 681-690.
Donnelly, Kevin S. et al. "A 660 MB/s Interface Megacell Portable Circuit in 0.3 um-0.7 um CMOS ASIC", IEEE Journal of Solid State Circuits; vol. 31, No. 12; Dec. 1996, pp. 1995-2003.
Allen, Arnold O., "Probability, Statistics, and Queueing Theory with Computer Science Applications", $2^{nd}$ Edition, CH 7; pp. 450, 458-459.
Chappell, Terry I. et al. "A 2ns Cycle, 4ns Access 512kb CMOS ECL SRAM", IEEE International Solid State Circuits Conference 1991; pp. 50-51.
Pilo, Harold et al., "A 300 MHz 3.3V 1 Mb SRAM Fabricated in a 0.5 um CMOS Process", IEEE International Solid State Circuits Conference 1996; pp. 148-149.
Schumacher, Hans-Jurgen et al., "CMOS Subnanosecond True-ECL Output Buffer", IEEE Journal of Solid-State Circuits, vol. 25, No. 1; Feb. 1990 pp. 150-154.
Yang, Tsen-Shau et al., "A 4-ns 4Kxl-bit Two-Port BiCMOS SRAM", IEEE Journal of D-State Circuits; vol. 23, No. 5; Oct. 1988; pp. 1030-1040.
Sidiropoulos, Stefanos, et al. "A 700 Mbps/pin CMOS Signalling Interface Using Current Integrating Receivers", IEEE Symposium on VLSI Circuits Digest of Technical Papers, 1996; pp. 142-143.
Bazes, Mel, "Two Novel Fully Complementary Self-Biased CMOS Differential Amplifiers", IEEE Journal of Solid State Circuits, vol. 26, No. 2., Feb. 1991.
Ishibe, Manabu et al., "High-Speed CMOS I/O Buffer Circuits", IEEE Journal of Solid State Circuits, vol. 27, No. 4, Apr. 1992.
Lee, James M. et al., "A 80ns 5V-Only Dynamic RAM", ISSCC Proceedings, Paper 12.2 ISSCC 1979.
Seki, Teruo et al., "A 6-ns 1-Mb CMOS SRAM with Latched Sense Amplifier", IEEE Journal of Solid State Circuits, vol. 28, No. 4., Apr. 1993.
Kobayashi, Tsuguo et al., "A Current-Controlled Latch Sense Amplifier and a Static Power-Saving Input Buffer for Low-Power Architecture", IEEE Journal of Solid State Circuits, vol. 28, No. 4., Apr. 1993.
Tomasini, Luciano et al. "A Fully Differential CMOS Line Driver for ISDN", IEEE Journal of Solid State Circuits, vol. 25, No. 2., Apr. 1990. pp. 546-585.
Farjad-Rad, Ramin et al., "A 0.4 um CMOS 10-Gb/s 4-PAM Pre-Emphasis Serial Link Transmitter", IEEE Journal of Solid State Circuits, vol. 34 No. 5, pp. 580-585, May 1999.
Yeung, Evelina et al., "A 2.4Gbps Per Pin Simultaneous Bidirectional Parallel Link with Per Pin Skew Compensation," ISSCC 2000, in press as of Jan. 9, 2000.
Portmann C. et al., "A Multiple Vendor 2.5-V DLL for 1.6-GB/s RDRaMs", IEEE VLSI Circuits Symposium, Jun. 1999.
Moncayo Alfredo, "Bus Design and Analysis at 500 MHz and Beyond", Presented at the High-Performance System Design Conference, 1995.
Lau, Benedict et al., "A 2.6-Gbyte/s Multipurpose Chip-to-Chip Interface", IEEE Journal of Solid-Circuits, vol. 33, No. 11 pp. 1617-1626, Nov. 1998.
Current, Wayne K., "Current-Mode CMOS Multiple-Valued Logic Circuits", IEEE Journal of Solid-State Circuits, vol. 29, No. 2, pp. 95-107, Feb. 1994.
Dally, William J. et al., "Digital Systems Engineering", Cambridge University Press, New York, NY, 1998, Index, pp. 344-347 and p. 352.
Farjad-Rad, Ramin et al., "An Equalization Scheme for 10Gb/s 4-PAM Signaling Over Long Cables," Presentation Center for Integrated Systems, Department of Electrical Engineering, Stanford University, Jul. 28, 1997.
Vranesic, Z.G. "Multivalued Signalling in Daisy Chain Bus Control", Proceedings of the Ninth International Symposium on Multiple-Valued Logic, Bath, England, pp. 14-18.

IBM Technical Disclosure Bulletin, "Use of Multibit Encoding to Increase Linear Recording Densities in Serially Recorded Records," Jun. 1967. pp. 14-15.

IBM Technical Disclosure Bulletin, "Coding for Data Tranmission", Jan. 1968, pp. 1295-1296.

IBM Technical Disclosure Bulletin, "Clock Recovery Circuit," Jul. 1969, pp. 219-220.

IBM Technical Disclosure Bulletin, "Tranmission by Data Encoding," Nov. 1970, p. 1519.

IBM Technical Disclosure Bulletin, "Bidirectional Communications within a Binary Switching System", Feb. 1976, pp. 2865-2866.

IBM Technical Disclosure Bulletin, "Multilevel Bidirectional Signal Tranmission", Feb. 1976, pp. 2867-2868.

IBM Technical Disclosure Bulletin, "Multilevel Signal Transfers," Oct. 1978, pp. 1798-1800.

IBM Technical Disclosure Bulletin, "Circuit for Multilevel Logic Implementation", Feb. 1981, pp. 4206-4207.

IBM Technical Disclosure Bulletin, "Multi Level Logic Testing", Apr. 1983, pp. 5903-5904.

IBM Technical Disclosure Bulletin, "Push-Pull Multi-Level Driver Circuit for Input-Output Bus", Sep. 1985, pp. 1649-1650.

IBM Technical Disclosure Bulletin, "Multilevel CMOS Sense Amplifier", Aug. 1986, pp. 1280-1281.

IBM Technical Disclosure Bulletin, "Multi-Level Encoded High Bandwidth Bus", Nov. 1992, pp. 444-446.

IBM Technical Disclosure Bulletin, "High Speed Complimentary Metal Oxide Semiconductor Input/Output Circuits", Feb. 1995, pp. 111 of 111-114.

IBM Technical Disclosure Bulletin, "Common Front End Bus for High-Performance Chip-to-Chip Communication", Apr. 1995, pp. 443-444.

IBM Technical Disclosure Bulletin, "High Performance Impedance Controlled CMOS Drive", Apr. 1995, pp. 445-446.

IBM Technical Disclosure Bulletin, "3-State Decoder for External 3-State Buffer", Apr. 1995, p. 477.

Matick, Richard E., "Tranmission Lines for Digital and Communication Networks: An Introduction to Transmission Lines, High-Frequency and High-Speed Pulse Characteristics and Applications," IEEE Press, New York, 1995, pp. 268-269.

Singh, Adit D. "Four Valued Buses for Clocked CMOS VLSI Systems", Proceedings of the Seventeenth International Symposium on Multiple-Valued Logic, The Computer Society of the IEEE. Boston, Massachusetts, May 26-28, 1987, pp. 128-133.

Smith, K.C. "The Prospects for Multivalued Logic: A Technology and Applications View", IEEE Transactions on Computers 1981, vol. C-30, No. 9, pp. 619-634.

Thirion, Walter, "10 Gig PMD Technologies", IEEE Plenary, Kaui, Hawaii, Nov. 1999. 10 pages.

Choi, Jong-Sang et al., "A CMOS 3.5Gbps Continuous-time Adaptive Cable Equalizer with Joint Adaptation Method of Low-Frequency Gain and High-Frequency Boosting," 2003 Symposium on VLSI Circuits Digest of Technical Papers. pp. 103-106.

Shakiba, Mohammad Hossein, "WP 23.3 A 2.5Gb/s Adaptive Cable Equalizer." 1999 IEEE International Solid-State Circuits Conference. pp. 396-397.

Baker, Alan J., "FA 10.7: An Adaptive Cable Equalizer for Serial Digital Rates to 400Mb/s." 1996 IEEE International Solid-State Circuits Conference. pp. 174-175.

Kudoh, Yoshiharu et al., "A 0.13-um CMOS 5-Gb/s 10-m 28 AWG Cable Transceiver with No-Feedback-Loop Continuous-Time Post-Equalizer." IEEE Journal of Solid-State Circuits, vol. 38, No. 5, May 2003. pp. 741-746.

Granberg, Tom, "Handbook of Digital Techniques for High-Speed Design." Cover and pub. pg., pp. 211-226.

Farjad-Rad, Ramin et al., "0.622-8.0Gbps 150mW Serial IO Macrocell with Fully Flexible Preemphasis and Equalization." 2003 Symposium on VLSI Circuits Digest of Technical Papers. 4 pages.

Stojanovic, Vladimir et al., "Adaptive Equalization and Data Recovery in a Dual-Mode (PAM2/4) Serial Link Transceiver." Jun. 2004. 4 pages. Rambus, Inc., Los Altos, CA 94022, USA and Department of Electrical Engineering, Stanford University, CA 94305, USA.

* cited by examiner

| FROM | TO | FIRST RECEIVED SIGNAL | TRANSITION DRIVE SIGNAL | SECOND RECEIVED SIGNAL |
|---|---|---|---|---|
| A | D | 0M+3S | 3M+3S | 3M+0S |
| A | C | 0M+3S | 2M+3S | 2M+1S |
| A | B | 0M+3S | 1M+3S | 1M+2S |
| B | A | 1M+2S | 0M+2S | 0M+3S |
| B | C | 1M+2S | 2M+2S | 2M+1S |
| B | D | 1M+2S | 3M+2S | 3M+0S |
| C | A | 2M+1S | 0M+1S | 0M+3S |
| C | B | 2M+1S | 1M+1S | 1M+2S |
| C | D | 2M+1S | 3M+1S | 3M+0S |
| D | A | 3M+0S | 0M+0S | 0M+3S |
| D | B | 3M+0S | 1M+0S | 1M+2S |
| D | C | 3M+0S | 2M+0S | 2M+1S |
FIG. 6
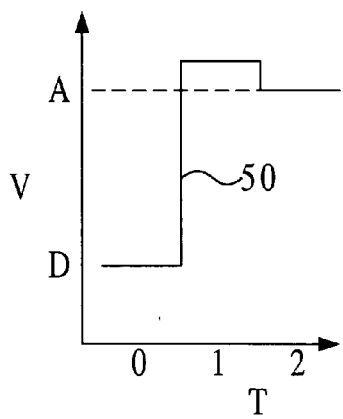
FIG. 7A
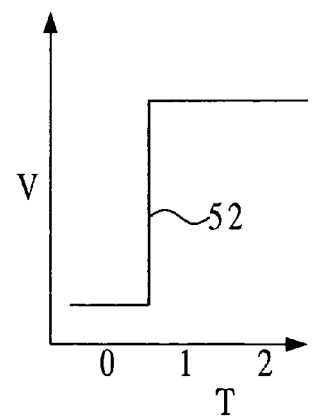
FIG. 7B
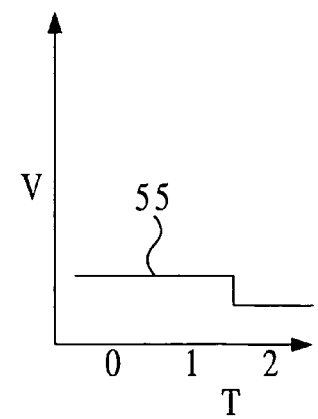
FIG. 7C

LOW-LATENCY EQUALIZATION IN MULTI-LEVEL, MULTI-LINE COMMUNICATION SYSTEMS

BACKGROUND

The present invention relates to multi-level digital signaling, and in particular to techniques to equalize or compensate for errors that may otherwise be present in a multi-level, multi-line signaling system.

The use of multiple signal levels instead of binary signal levels is a known technique for increasing the data rate of a digital signaling system, without necessarily increasing the signal frequency of the system. Such multi-level signaling is sometimes known as multiple pulse amplitude modulation or multi-PAM, and has been implemented with radio or other long-distance wireless signaling systems.

Other long-distance uses for multi-PAM signaling include computer or telecommunication systems that employ Gigabit Ethernet over optical fiber (IEEE 802.3z) and over copper wires (IEEE 802.3ab), which use three and five signal levels, respectively, spaced symmetrically about and including ground. Equalization techniques for long-distance multi-level signaling systems such as those used in radio or telecommunication networks commonly include adaptive filters, which can change equalization characteristics adaptively to improve equalization accuracy or in response to changing conditions. The complexities of these equalization techniques can delay signaling by slight but tolerable amounts for these long-distance systems.

Multi-PAM is not traditionally used for communication between devices in close proximity or belonging to the same system, such as those connected to the same integrated circuit (IC) or printed circuit board (PCB). One reason for this may be that within such a system the characteristics of transmission lines, such as buses or signal lines, over which signals travel are tightly controlled, so that increases in data rate may be achieved by simply increasing data frequency. At higher frequencies, however, receiving devices may have a reduced ability to distinguish binary signals, so that dividing signals into smaller levels for multi-PAM is problematic. Multi-PAM may also be more difficult to implement in multi-drop bus systems (i.e., buses shared by multiple processing mechanisms), since the lower signal-to-noise ratio for such systems sometimes results in bit errors even for binary signals. Moreover, complex equalization techniques such as employed for long distance communication systems may not be feasible in a bus system for which low latency is a performance criterion.

SUMMARY

The present invention is directed to low-latency equalization mechanisms for short-range communications systems. Such equalization mechanisms may compensate for signal attenuation along a transmission line, reflections due to impedance discontinuities along such a line, and crosstalk between adjacent lines. The equalization mechanisms may be particularly advantageous for multi-PAM communications systems.

BRIEF DESCRIPTION OF THE FIGURES

FIG. 6 provides a table illustrating the signal levels involved in transitioning between the logical states of FIG. 5.

FIG. 7A shows initial, transition and final states of a signal that may represent a transition illustrated in FIG. 6.

FIG. 7B shows initial, transition and final states of a main component of the signal shown in FIG. 7A.

FIG. 7C shows initial, transition and final states of an auxiliary component of the signal shown in FIG. 7A.

FIG. 18 shows a combination of the signals of FIGS. 18*b*-18*c*- and -FIG. 18E shows an integration signal of FIG. 18D

DETAILED DESCRIPTION OF THE PREFERRED EMBODIMENT

Figure 1:
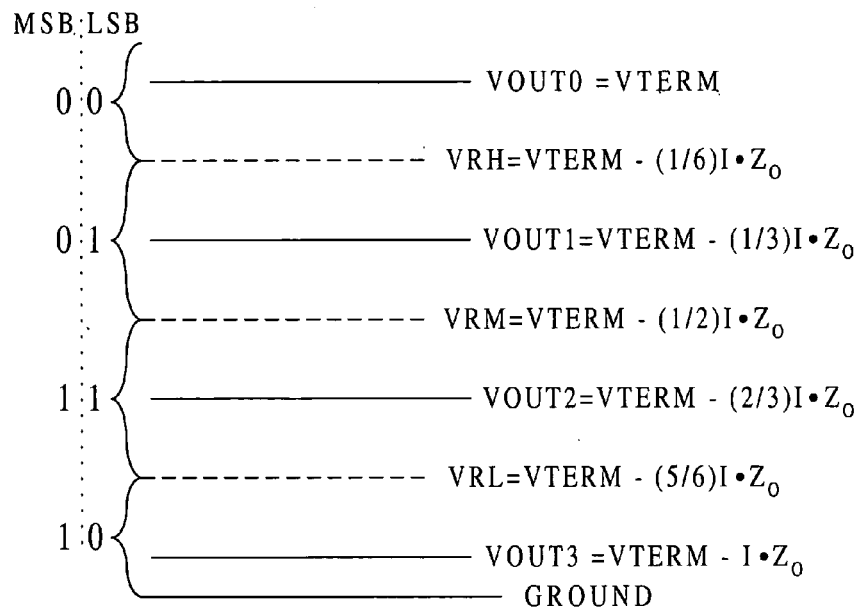
FIG. 1 shows a multi-level signaling system having four logical states corresponding to four voltage ranges.

FIG. 1 shows a multi-level signaling system having four logical states corresponding to four voltage levels, VOUT0, VOUT1, VOUT2 and VOUT3. The voltage levels in this example are all positive relative to ground, and range as high as VTERM. VOUT0 is defined to be above VREFH, VOUT1 is defined to be between VREFM and VREFH, VOUT2 is defined to be between VREFL and VREFM, and VOUT3 is defined to be less than VREFL. VOUT0 corresponds to logical state 00, VOUT1 corresponds to logical state 01, VOUT2 corresponds to logical state 11, and VOUT3 corresponds to logical state 10. A first bit of each logical state is termed the most significant bit (MSB) and a second bit of each logical state is termed the least significant bit (LSB). Each logical state may be termed a dual-bit, since it provides information regarding two bits. Data may be transmitted and read at both rising and falling edge of a clock cycle, so that each bit signal and each dual-bit signal has a duration of one-half the clock cycle. The logical states are arranged in a Gray coded order, so that an erroneous reading of an adjacent logic state produces an error in only one of the bits. Another characteristic of this logical 4-PAM arrangement is that setting the LSB equal to zero for all states results in a 2-PAM scheme.

Alternatively, the logical states can be arranged in binary (00, 01, 10, 11) or other order.

In one embodiment the communication system is employed for a memory bus, which may for instance include random access memory (RAM), like that disclosed in U.S. Pat. No. 5,243,703 to Farmwald et al., which is incorporated herein by reference. The multi-PAM communication and low-latency signal correction techniques disclosed herein may also be used for other contained systems, such as for communication between processors of a multiprocessor apparatus, or between a processor and a peripheral device, such as a disk drive controller or network interface card over an input/output bus.

Figure 2:
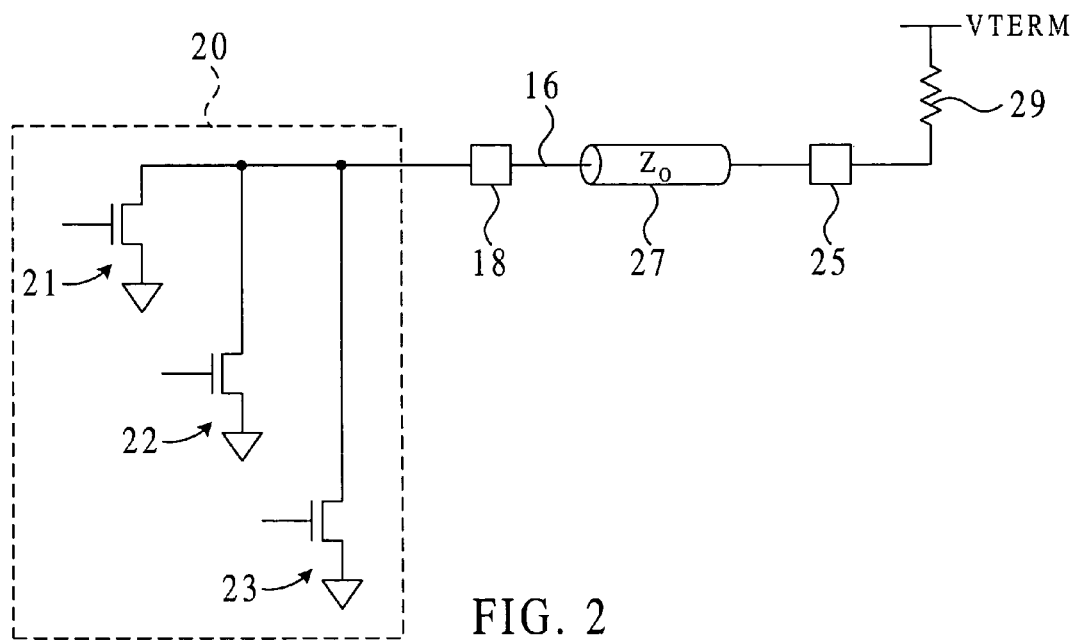
FIG. 2 shows a representative signaling device that may be used to create the voltage levels of FIG. 1.

FIG. 2 shows a representation of a communication system that may be used to create the voltage levels of FIG. 1. An output driver 20 drives signals to output pad 18 and over transmission line 16, which may for example be a memory bus or other interconnection between devices affixed to a circuit board, to be received at pad 25. Transmission line 16 has a characteristic impedance $Z_0$ 27 that is substantially matched with a terminating resistor 29 to minimize reflections. Output driver 20 includes first 21, second 22 and third 23 transistor current sources, which together produce a current I when all are active, pulling the voltage at pad 25 down from VTERM by $I \cdot Z_0$, signaling logical state 10 under the Gray code system. To produce voltage VOUT0=VTERM, signaling logical state 00, current sources 21, 22 and 23 are all turned off. To produce voltage VOUT1=VTERM−(⅓)$I \cdot Z_0$, signaling logical state 01, one of the current sources is turned on, and to produce voltage VOUT2=VTERM−(⅔)$I \cdot Z_0$, two of the current sources are turned on. The logical level 00 is chosen to have zero current flow to reduce power consumption for the situation in which much of the data transmitted has a MSB and LSB of zero. The reference levels are set halfway between the signal levels, so that VREFH=VTERM−(⅙) $I \cdot Z_0$, VREFM=VTERM−(½) $I \cdot Z_0$ and VREFL=VTERM−(⅚) $I \cdot Z_0$. Related disclosure of a multi-PAM signaling system can be found in U.S. patent application Ser. No. 09/478,916, entitled Low Latency Multi-level Communication Interface, filed on Jan. 6, 2000, which is incorporated by reference herein. Also incorporated by reference herein is a Provisional U.S. patent application entitled, "A 2 Gb/s/pin 4-PAM parallel bus interface with transmit crosstalk cancellation & equalization and integrating receivers," filed on even date herewith, by Express Mail Label No.EK533218494US, inventors Pak Shing Chau et al.

Figure 3:
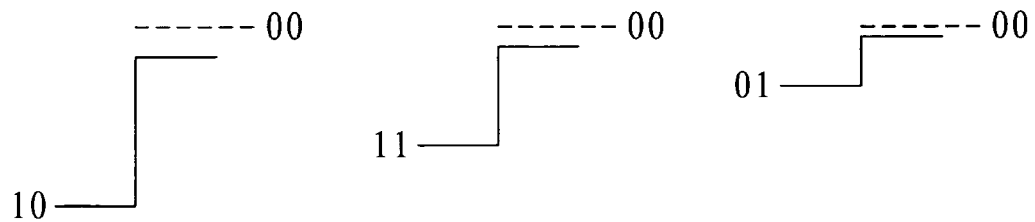
FIG. 3 depicts an issue with a multi-PAM signaling system such as the 4-PAM system shown in FIG. 1 and FIG. 2.

FIG. 3 depicts an issue with a multi-PAM signaling system such as the 4-PAM system mentioned above. For cases in which attenuation of a signal exists between transmission and reception, different amounts of signal loss may occur depending upon the magnitude of the transition between logic levels. For instance, transitioning between a 10 state and a 00 state may have a greater signal deficiency than a transition between a 11 state and the 00 state, which in turn has a greater signal deficiency than a transition between 01 state and the 00 state, while maintaining the same logic state over plural bit periods may have no attenuation error. Thus each different transition between states may have a different associated error. Complicating matters is the transitory nature of the errors as demonstrated, for example, by the fact that maintaining a constant logic state may generate no error, regardless of the previous transition magnitude to that logic state and the error associated with that transition.

Figure 4:
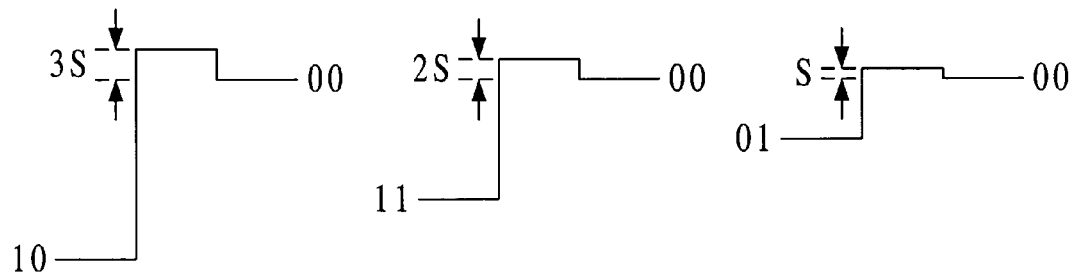
FIG. 4 shows a solution to the issue depicted in FIG. 3.

FIG. 4 shows the addition of a different equalization signal, 3S, 2S or S to the main signal when driving different transitions, the equalization signals compensating for the attenuation of the received signal. The equalization signals in this embodiment are transitory, so that each may for instance have a duration less than or equal to one bit signal, after which the equalization signal is terminated, allowing the initially overdriven signal to maintain a steady state logic level. Stated differently, the equalization signals S, 2S or 3S add predetermined high-frequency components to the transition signals that raise the slope of the edge of the transition. A difficulty with this approach for a system such as shown in FIG. 1 is that the voltage can only be pulled down from VTERM, unless negative current could flow through current sources 21-23. In other words, with the 00 level set at VTERM in FIG. 5 it is difficult for the equalizing S, 2S or 3S to add to the transition above VTERM.

Figure 5:
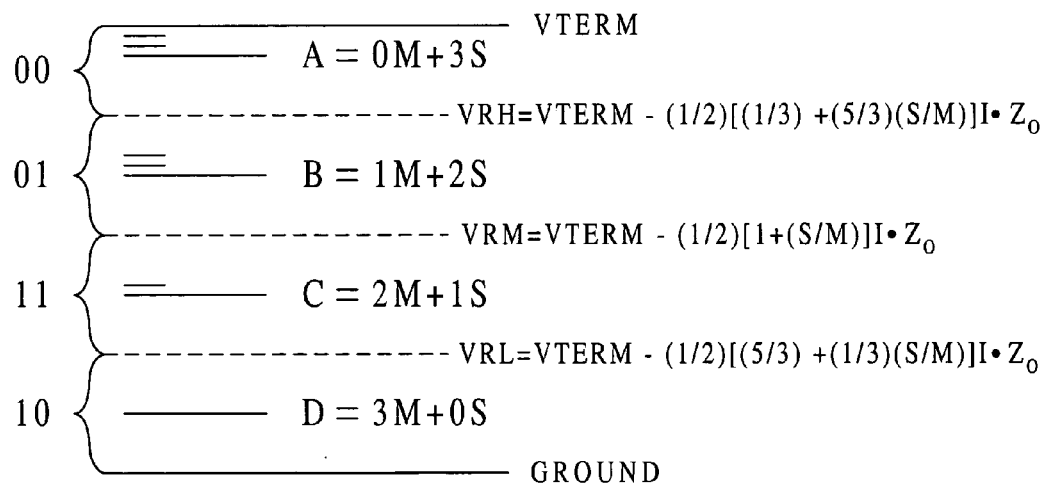
FIG. 5 depicts a multi-level (4-PAM) signaling system in which voltage ranges for the logic states are shifted by varying amounts to implement the solution shown in FIG. 4.

FIG. 5 depicts a multi-level (4-PAM) signaling system in which the 00 logic state is reduced below VTERM by 3S, in order to allow overdriving a transition for example from the 10 to the 00 state by 3S. This 00 logic level is termed A, and can be provided by having none of the main current drivers turned on and three equalization drivers turned on, for a voltage level of 0M+3S. On the other hand, the 10 level (termed D) can be pulled lower if necessary to overdrive a transition, and so it is characterized by having three main drivers or current sources turned on, but zero equalization drivers turned on, for a total voltage level of 3M+0S. Logical state 01, also termed level B, has a voltage of 1M+2S, while state 11, termed level C, has a voltage of 2M+1S. The reference levels that provide boundaries between the signal levels are also shifted in accordance with the shift in the signal levels. Thus VRH is defined in this system to be equal to VTERM−(½) [(⅓)+(⅚) (S/M)]$I \cdot Z_0$, VRM is defined in this system to be equal to VTERM−(½) [1+(S/M)]$I \cdot Z_0$ and VRL is defined in this system to be equal to VTERM−(½) [(⅚)+(⅓) (S/M)]$I \cdot Z_0$.

FIG. 6 provides a table illustrating the drive signal levels involved in transitioning between the logical states of FIG. 5. In order to transition from initial state A (0M+3S) to final state D (3M+0S), for example, an overdriven transition drive signal of 3M+3S is provided. Conversely, changing from an initial state D (3M+0S) to final state A (0M+3S) involves a drive signal of 0M+0S. The transition drive signal in this example has an overdriven duration that is equal to that of one bit (or dual-bit) signal, although in general an overdriven period of a drive signal may have a duration that is less than or greater than that of a bit signal. For example, a drive signal may be overdriven for a first portion of a bit signal time, with a second portion of that signal not being overdriven.

Several characteristics are apparent from the table of FIG. 6. First note that for the received signals, the M multiplier is the complement of the S multiplier. Also note that the drive signal S multiplier is equal to the initial S multiplier, while the transition M multiplier is equal to the final M multiplier. Also note that the table depicted in FIG. 6 illustrates just one set of transition drive signals specific to a 4-PAM signaling system with a single error correction, and may be extrapolated to be used with communication systems having additional signal levels and additional error corrections. For instance, a similar table may be constructed to deal with signal reflections, although such reflections may be either positive or negative and may have a delay of more than one bit signal duration, as measured at the signal receiver.

FIGS. 7A-C show drive signals that may, for example, represent the transition from state D to A of FIG. 6, which for clarity of illustration is then shown to remain at state A for the next bit signal. FIG. 7A shows a signal 50 with an overdriven transition during period 1 between an initial voltage during period 0 and a final voltage during period 2. The signal 50 can be made from a combination of a step function signal 52, shown in FIG. 7B, and a another step function signal 55, shown in FIG. 7C, that is a scaled, inverted and delayed function of the signal 52. In this example, the voltage change of signal 55 is a small fraction of that of signal 52, delayed by one period, which may be equal to a bit signal duration.

Figure 8:
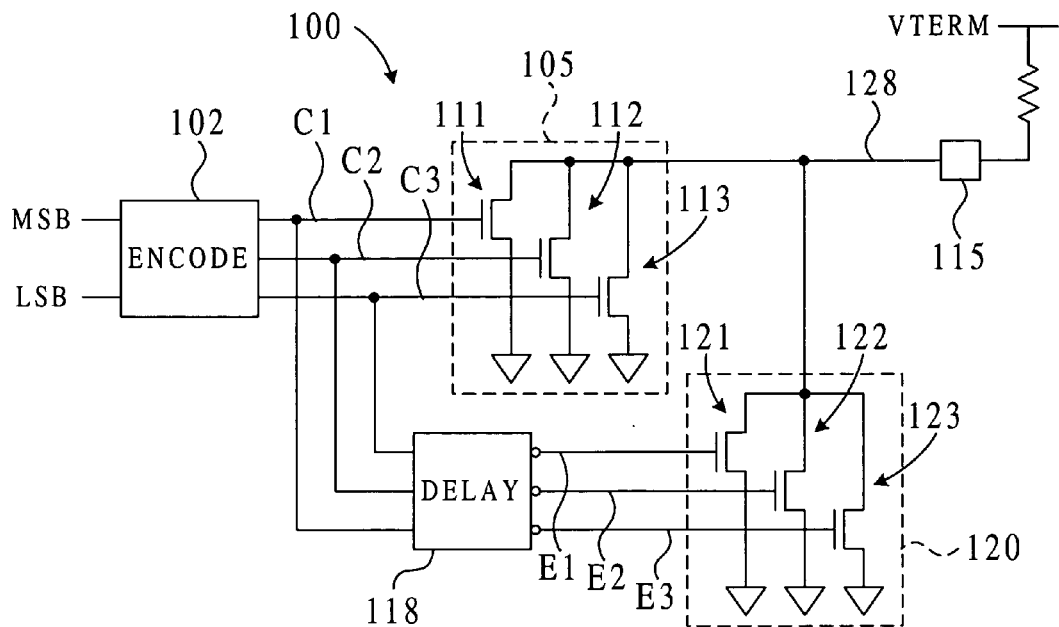
FIG. 8 shows a device that can provide the transition signals shown in FIG. 6 and FIGS. 7A-C.

FIG. 8 shows a device 100 that can provide the transition drive signals shown in FIG. 6 and FIG. 7. An encoder 102 receives binary MSB and binary LSB signals and converts pairs of those 2-PAM signals into digital input signals along lines C1, C2 and C3 for a main driver 105 having three current sources 111, 112 and 113, to convert the binary data of the MSB and LSB into 4-PAM data at an output pad 115. The input signals on lines C1, C2 and C3 may be thought of as a thermometer code for the driver; the more input signals on, the more current sources 111, 112 and 113 are activated.

Also receiving the input signals from encoder 102 is delay mechanism 118, which inverts and delays by one bit signal period the input signals to feed signals E1, E2 and E3 to auxiliary driver 120. Auxiliary driver current sources 121, 122 and 123 are similar to respective main driver current sources 111, 112 and 113, but each auxiliary driver current source 121, 122 and 123 has a gain that is a fraction of respective main driver current sources 111, 112 and 113. Thus when main driver 105 outputs signal 52 of FIG. 7B, auxiliary driver 120 outputs signal 55 of FIG. 7C, which is delayed, inverted and proportional to signal 52. The signals 52 and 55 combine at line 128 to form the desired signal 50 of FIG. 7A.

Referring again to FIG. 6, the main driver 105 can be represented with the letter M and the auxiliary driver 120 with the letter S, with the numeral preceding each letter describing how many of the respective current sources are active. Thus FIG. 7B may represent the voltage driven by the main driver 105, which transitions from 3M to 0M at T=1, and FIG. 7C may represent the voltage driven by the auxiliary driver 120, which transitions from 0S to 3S at T=2. A ratio of the gain of the auxiliary driver, S, to that of the main driver, M, is termed k, the equalization coefficient of the auxiliary driver. The ratio k is less than one, and may range from about one percent to about fifty percent.

Although current sources 111, 112, 113, 121, 122 and 123 are shown as having a single transistor, each of these current sources may include multiple transistors that may differ in power or number from the other current sources. The output voltages of the device 100 of FIG. 8 would have a distortion, for example, if each of the current sources 111, 112 and 113 were identical, since the drain to source voltage drop for each depends in part on whether the others are active, affecting the current. To compensate for this gds distortion the current sources can differ in number or transistor gain, e.g., by adjusting channel width. Current sources 111, 112, 113, 121, 122 and 123 may also receive additional input signals, for example, to adjust signal strength due to process, voltage and temperature (PVT) conditions. In addition, data may be transmitted at both rising and falling clock edges, so a pair of substantially identical main drivers and auxiliary drivers may exist for driving multi-PAM signals from input signals generated from MSB and LSB odd and even signals.

Auxiliary driver current sources 121, 122 and 123, which may also suffer from gds distortion unless adjusted as described above, drive much less current than the corresponding main driver current sources 111, 112 and 113. For example, each of main driver current sources 111, 112 and 113 may be formed of more current sources than respective auxiliary driver current sources 121, 122 and 123. Alternatively, main driver current sources 111, 112 and 113 may be formed of transistors having wider channels than those of respective auxiliary driver current sources 121, 122 and 123. Thus the output of auxiliary driver current sources 121, 122 and 123 are substantially proportional to the main driver current sources 111, 112 and 113.

Figure 9:
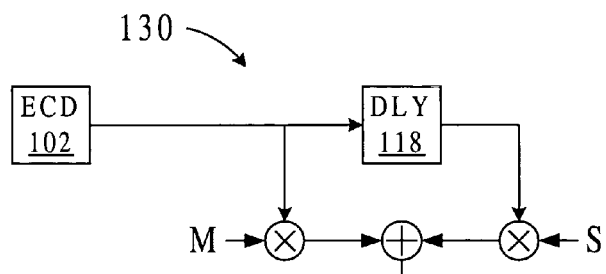
FIG. 9 shows a finite impulse response (FIR) filter representation of the device of FIG. 8.

In FIG. 9, the drivers 105 and 120 and delay element 118 are represented as a FIR filter 130. Input signals from the encoder are sent to the filter, which operates on the signals with function M and delays, inverts and operates on the signals with function S, to output a filtered signal.

Figure 10:
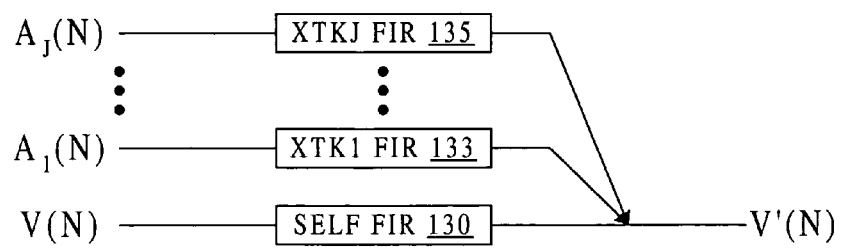
FIG. 10 shows a general equalization system for a signal line, including a self equalization FIR filter and a number of crosstalk equalization FIRs.
Figure 11A:
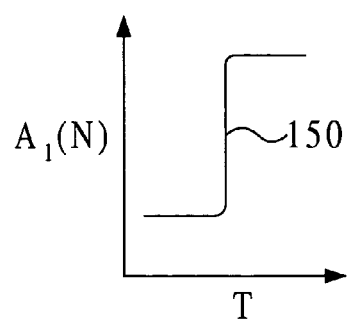
FIG. 11A shows a signal transition that may create crosstalk on adjacent signal lines.
Figure 11B:
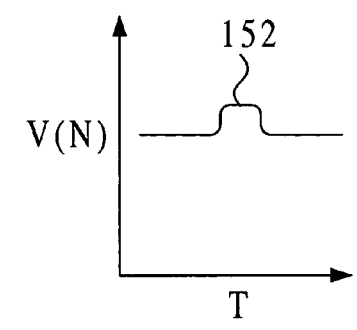
FIG. 11B shows crosstalk noise from the signal transition of FIG. 11A, imposed on a signal in an adjacent line.
Figure 11C:
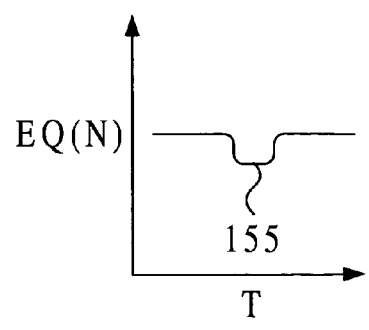
FIG. 11C shows an equalization signal that compensates for the crosstalk noise shown in FIG. 11B.
Figure 11D:
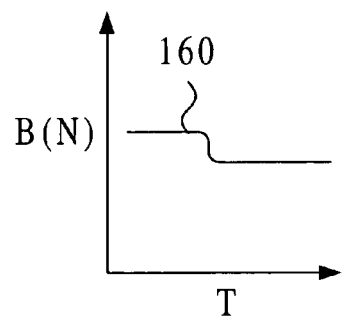
FIG. 11D shows a first component of the equalization signal shown in FIG. 11C.
Figure 11E:
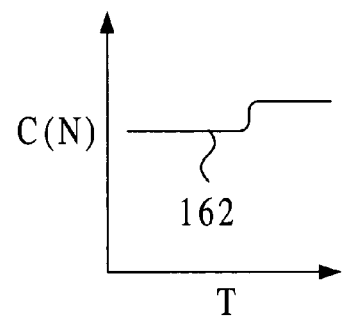
FIG. 11E shows a second component of the equalization signal shown in FIG. 11C.

Equalization techniques similar to those described above for attenuation can be used to compensate for crosstalk and reflection errors. FIG. 10 and FIG. 11 show a general system for filtering errors on a line V(N) using self equalization FIR 130 as described above and with crosstalk equalization FIR 133 and crosstalk equalization FIR 135 due to crosstalk from adjacent lines $A_1(N)$ through $A_J(N)$, respectively, to produce equalized output V'(N). FIG. 11A shows a step function signal 150 in line $A_1$ that generates, as shown in FIG. 11B, a transient signal 152 in line V due to inductive coupling. FIG. 11C shows an equalization signal 155 that is generated by inputting signal 150 to crosstalk equalization FIR 133 to compensate for transient signal 152. Capacitive crosstalk generated in line V from lines $A_1$ through $A_J$ can be equalized in a similar fashion. Both inductive and capacitive crosstalk may generate a transient signal having a polarity dependent upon the location of the receiver compared to the location at which the transient signal was generated. FIG. 11D shows a first signal component 160 that may be used to compensate for such an inductive or capacitive crosstalk error, which is a scaled and inverted function of signal 150 that generated the error. FIG. 11E shows a second signal component 162 that may be added to the signal 160 to create the crosstalk equalization signal 155 of FIG. 11C. Signal 162 can be scaled or fractional function of signal 150 that is delayed one bit period.

Figure 12:
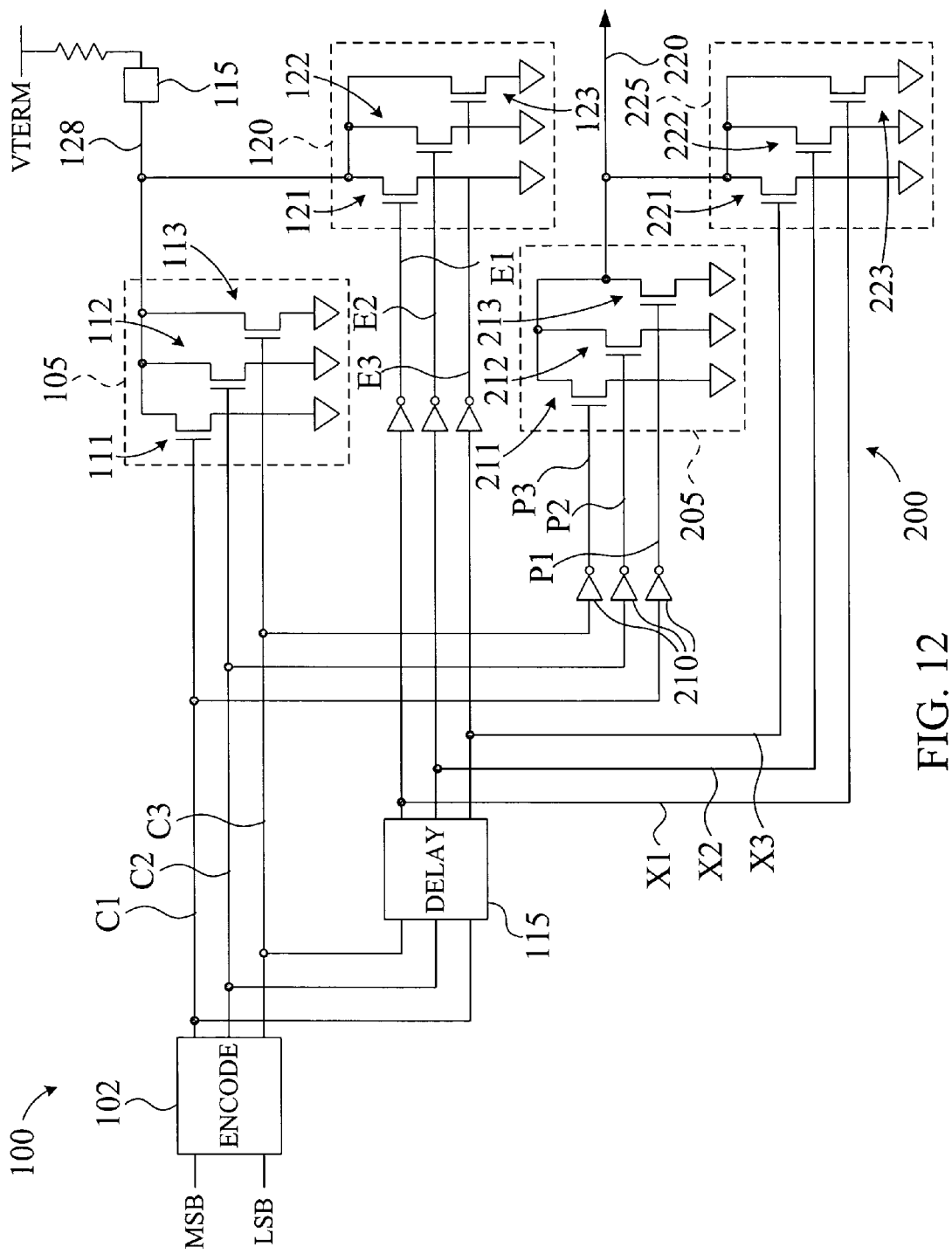
FIG. 12 shows a signal driver, self-equalization and crosstalk equalization communication device.

FIG. 12 shows a mechanism 200, connected with device 100 of FIG. 8, that can be used to equalize inductive or capacitive crosstalk errors created by signals in line 128 and felt in lines that are adjacent line 128, the adjacent lines not shown in this figure. A first crosstalk equalization driver 205 receives signals along lines P1, P2 and P3 that have been inverted by inverters 210, controlling current sources 211, 212 and 213. The combined current from those current sources 211, 212 and 213 is output on a crosstalk equalization line 220 that is connected to an adjacent line, not shown, the adjacent line subjected to crosstalk errors from line 128. The output on line 220 from driver 205 is thus scaled and inverted compared to the signal produced by main driver 105, much like signal 160 of FIG. 11D is a scaled and inverted compared to signal 150 in FIG. 11A.

A second crosstalk equalization driver 225 receives input signals along lines X1, X2 and X3 that have been delayed by delay 110, lines X1, X2 and X3 controlling current sources 221, 222 and 223. Thus the output of second crosstalk equalization driver 225 on line 220 is delayed and scaled compared to the signals produced by main driver 105, much like signal 162 of FIG. 11E is scaled and delayed compared to signal 150 in FIG. 11A. The combined output of crosstalk equalization drivers 205 and 225 on line 220 is much like signal 155 of FIG. 11C, which can be used to compensate for transient signal 152 of FIG. 11B. Thus crosstalk equalization drivers 205 and 225 can compensate for crosstalk inflicted by line 128 on nearby lines. An advantage of the circuit shown in FIG. 12 is that cost and space effective circuits are implemented that generate equalization signals by tapping into the input signals for the main signal driver, instead of generating equalizing signals based upon the output signals that are transmitted.

Similar equalization mechanisms can be used to compensate for reflections in a transmission line due to impedance discontinuities in the line. These reflections may be positive or negative, and may occur at various times relative to the main signal. Thus for example a known reflection may occur at a receiver with a delay of two clock cycles, for which plural unit delay elements may be provided between the input signals and the compensation circuits. Moreover, although a 4-PAM signaling system is shown, additional signal levels are possible with the provision of additional current sources. Unit delay elements may be provided for example by flip-flops, whereas delay elements that generate delays of less than a bit period may be provided for instance by inverters.

Figure 13:
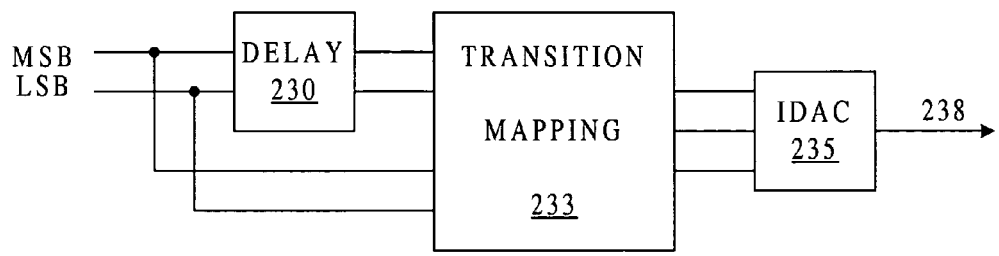
FIG. 13 shows an equalization mechanism that inputs MSB and LSB signals to provide compensation.

FIG. 13 shows another mechanism for equalizing multi-PAM signals, however the equalization mechanism inputs, on two lines, the MSB and LSB signals, rather than inputting the three lines of thermometer code inputs. A unit delay element 230 receiving the MSB and LSB outputs those signals with a delay substantially equal to one signal bit duration. Unit delay 230 allows comparison at transition mapping device 233 of the MSB and LSB with the previous MSB and LSB, to gauge the multi-PAM transition between the prior and current MSB and LSB. Based upon this transition, transition mapping device 233 outputs a three bit signal to current digital-analog converter (IDAC) 235, which drives a compensation signal on line 237, which in this example connects with a multi-PAM signal, not shown in this figure, to compensate for crosstalk on that other line.

Figure 14:
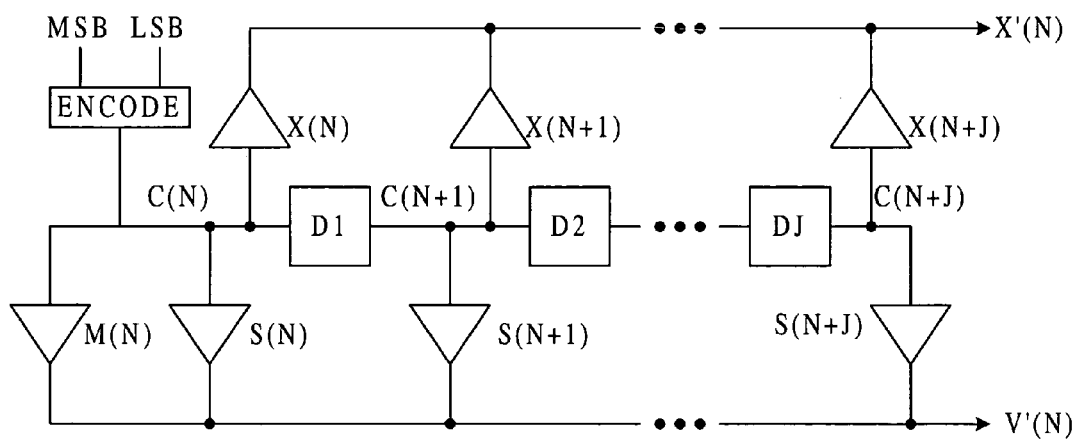
FIG. 14 shows a general FIR filter having a number of self-equalization and crosstalk-equalization mechanisms tapped at various delay times.

FIG. 14 shows such a general equalization system that can be used to compensate for various signal imperfections, whether the imperfections are due to attenuation, crosstalk, or reflections. Input signals on lines C(N) that control a main driver M(N) pass through a number J of delay elements D1 through DJ, each of which delay the input signals by one bit signal period. Various self-equalization drivers S(N) through S(N+J), each of which is proportional to main driver M(N), are tapped off the input signals at various delay times. The equalization drivers S(N) through S(N+J) may each have a gain that is a different fraction of that of the main driver, and may or may not invert the input signals, depending upon the particular equalization desired. The output of the main driver and each of the equalization drivers are then combined to produce equalized signal V' (N). Various crosstalk-equalization drivers X(N) through X(N+J), each of which is proportional to main driver M(N), are also tapped off the input signals at various delay times, to provide crosstalk compensation signal X' (N) to an adjacent signal line.

Figure 15:
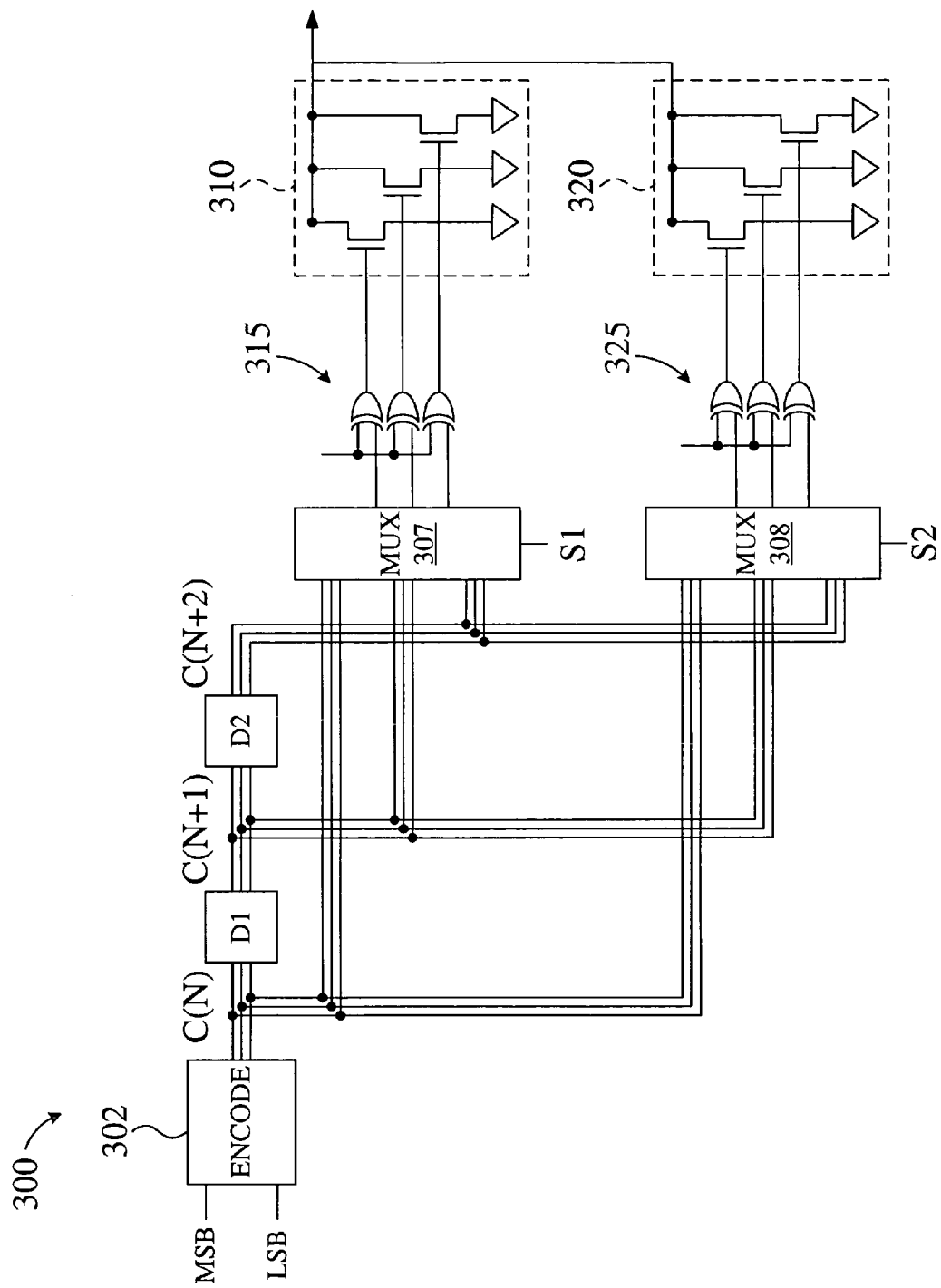
FIG. 15 illustrates a mechanism for adjusting equalization parameters such as the magnitude, timing and sign of various equalization signals.

FIG. 15 illustrates a mechanism 600 for adjusting equalization parameters such as the magnitude, timing and sign of the equalization signal. An encoder 302 provides input signals on lines C(N) to a main signal driver, not shown in this figure, the input signals also encountering delay elements D1 and D2 that delay the input signals C(N) by one unit delay each, to provide delayed signals on lines C(N+1) and C(N+2). Signals on lines C(N), C(N+1) and C(N+2) are input to multiplexers MUX 307 and MUX 308, which choose, based upon selection lines S1 and S2, which of input signals on lines C(N), C(N+1) and C(N+2) to input to equalization drivers 310 and 320. As discussed, the equalization drivers may have different current gains. Exclusive OR gates 315 and 325 can be controlled to invert or not to invert the input signals selected by multiplexers MUX1 and MUX2. This system can be expanded to provide multiple equalization drivers, XOR gates, multiplexers and delay elements, which together afford a variety of combinations of scaling, timing and inversion of the input signals to produce a desired equalization.

Figure 16:
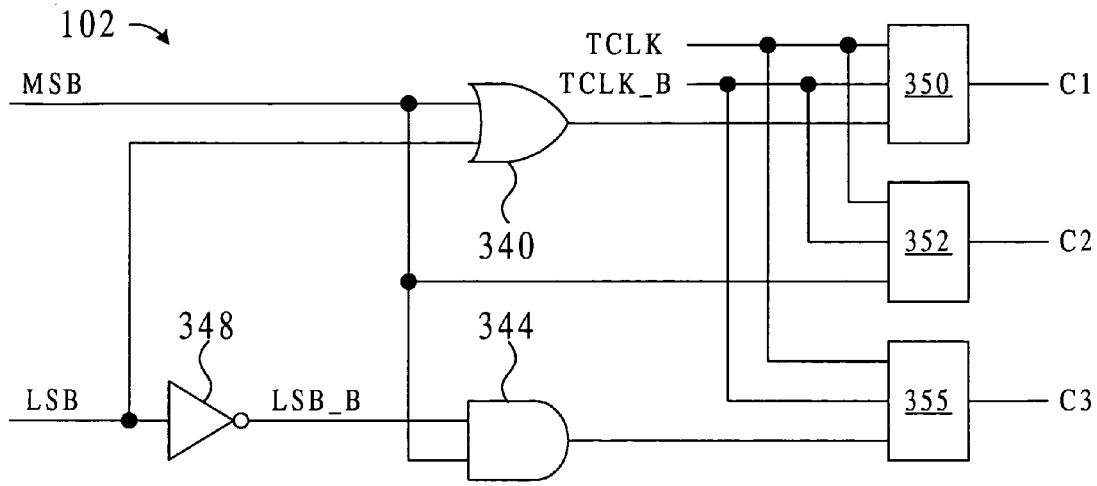
FIG. 16 shows an encoder that converts MSB and LSB signals into input signals for the output driver and equalization mechanisms.

FIG. 16 shows the encoder 102 that converts MSB and LSB signals into input signals that are output on lines C1, C2 and C3 to control the output driver 105. Data may be transmitted and read at both rising and falling clock edges, so a pair of identical encoders may exist for translating MSB and LSB odd and even signals, with the encoders' output multiplexed on lines C1, C2 and C3. The MSB is input to a latch 352 that also receives a transmit clock signal (TCLK) and complementary transmit clock signal (TCLK_B) for differentially latching the MSB as an input signal on line C2. The MSB is also input to an OR gate 340 that receives as the other input LSB. The output of OR gate 340 is latched at 350, which outputs another input signal on line C1. The LSB passes through inverter 348 to become LSB_B, which is input to an AND gate 344 that receives as the other input the MSB. The output of AND gate 344 is clocked at 355 and output on line C3 as a third input signal.

Thus for MSB=0 and LSB=0, all the input signals are off. For MSB=0 and LSB=1, the OR gate 340 outputs on so that input signal C1 is on, but C2 and C3 are still off. When both MSB=1 and LSB=1, input signals C1 and C2 are on, but AND gate 344 inputs LSB_B, which is low so the input signal on line C3 is off. When MSB=1 and LSB=0, input signals on all the lines C1, C2 and C3 are turned on. In this fashion the MSB and LSB may be combined as Gray code and translated to thermometer code input signals on lines C1, C2 and C3 that control the current sources to drive 4-PAM signals.

Figure 17:
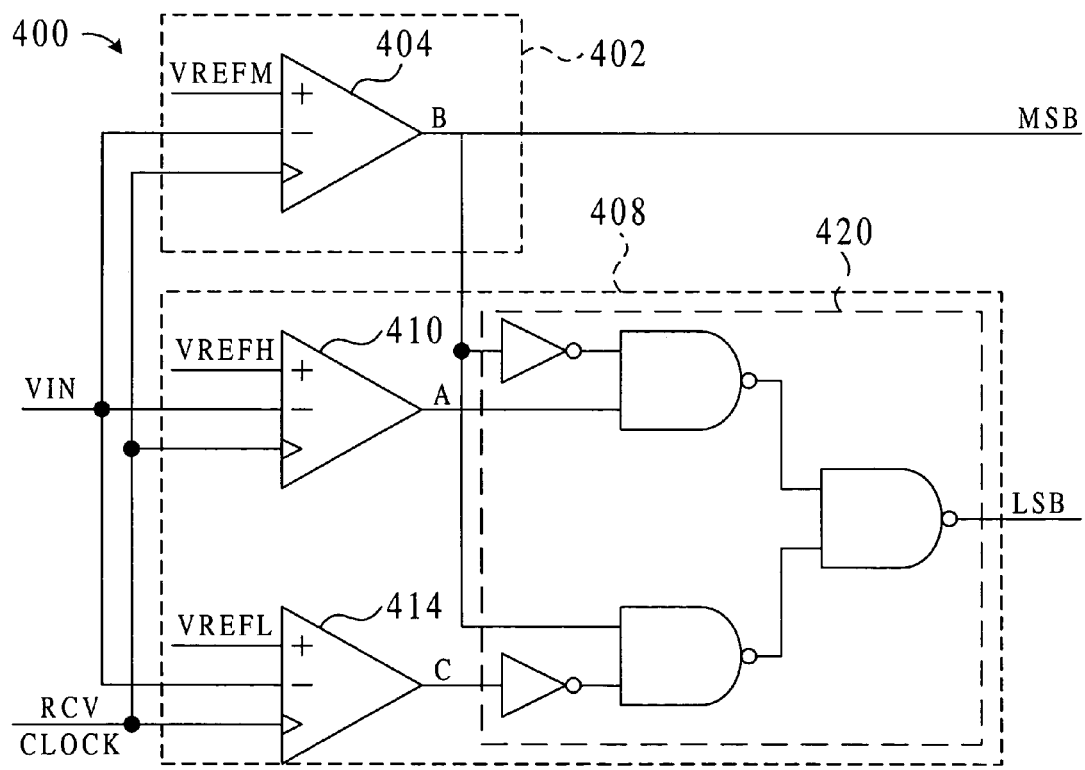
FIG. 17 shows receiver that receives the multi-level signals sent by the main and auxiliary drivers and decode the signals into MSB and LSB components.

FIG. 17 shows an integrating receiver 400 that may be used to receive the multi-level signals sent by drivers such as those described above, and decode the signals into MSB and LSB components. As mentioned above, the data may be transmitted at twice the clock frequency, and a pair of receivers 400 may read even and odd data. An MSB receiver 402 of the 4-PAM receiver 400 in this example receives and decodes a 4-PAM input signal VIN by determining whether the signal VIN is greater or less than VREFM. In the MSB receiver 402, a latching comparator 404 compares the value of the voltage of the received input signal VIN to the reference voltage VREFM and latches the value of the result of the comparison B in response to a receive clock signal. In one embodiment, data is taken at both rising and falling clock edges. In an LSB receiver 408 two latching comparators 410 and 414 compare the value of the voltage of the received input signal VIN to the reference voltages VREFH and VREFL, and latch the value of the result of the comparison A and C, respectively, in response to the receive clock signal. To decode the LSB, the signals from the comparator outputs B, A, and C are then passed through combinational logic 420. The latching comparators 404, 410 and 414 are implemented as integrating receivers to reduce the sensitivity of the output signal to noise. This can be accomplished by integrating a comparison of whether the input signal is above or below the reference voltages over most or all of the bit cycle, and then latching the integrated result as the outputs A, B and C. Examples of integrating receivers can be found in above-referenced U.S. patent application Ser. No. 09/478,916.

Errors generated by crosstalk or capacitive coupling may be attenuated by the time they reach a receiver, which may in circuit board implementations be located up to about a foot away from the signal drivers, much as the transitions are attenuated over that distance. For crosstalk errors this attenuation may actually be beneficial as it tends to smooth out a high-frequency transient signal into a transient signal that may be compensated with an equalization having a duration of one bit. In a situation for which a neighbor's signal still has a high-frequency component when received, an integrating receiver can also smooth the data, so that compensating for a DC component of the crosstalk can be accomplished.

Figures 18A, 18B, 18C:
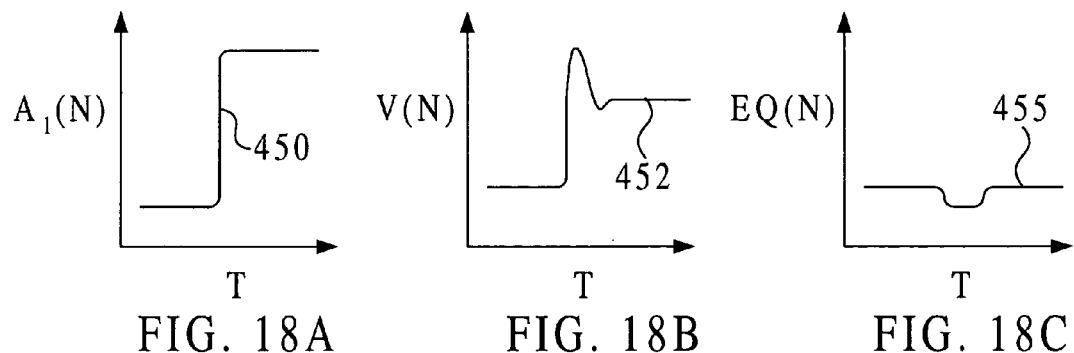
FIG. 18A shows a signal transition that has a high-frequency noise spike.
FIG. 18B shows an equalization signal designed to compensate for a DC component of the spike of FIG. 18*a* and FIG. 18*b* by integration.
Figure 18B:
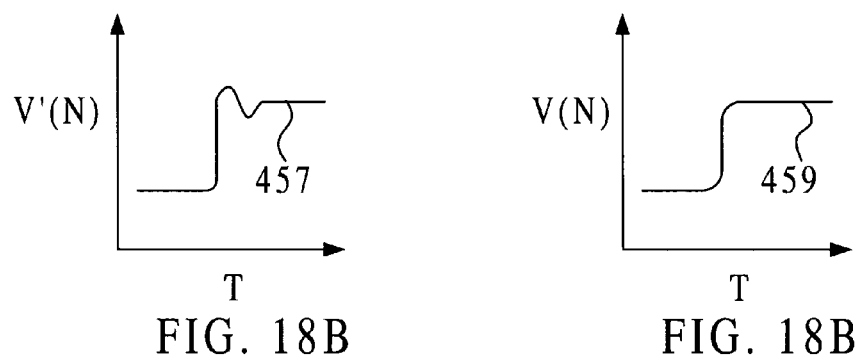

FIG. 18A shows a signal 450 undergoing a transition that may generate crosstalk in an adjacent line having a signal 452 shown in FIG. 18B. The crosstalk is apparent in FIG. 18B as a spike or high frequency component that is disturbing a step function transition. FIG. 18C shows an equalization signal 455 designed to compensate for a DC component of the spike of FIG. 18B. Combination of signal 452 and compensating signal 455 is shown in FIG. 18D as signal 457, which may leave a dipole component of the spike uncompensated. FIG. 18E shows that after integration by the receiver of FIG. 17 the dipole component has been removed, leaving a smooth transition signal 459.

Figure 19:
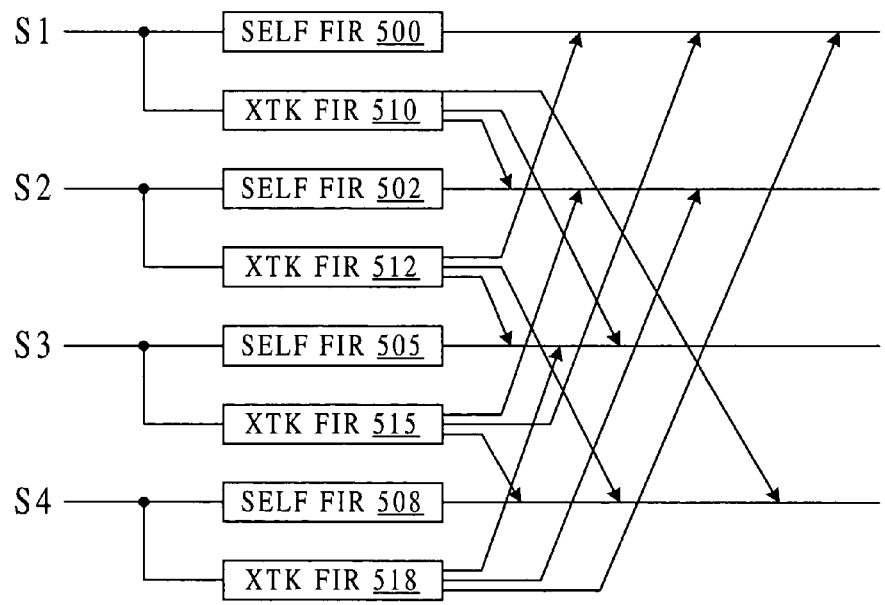
FIG. 19 shows a system with a number of adjacent signal lines that may create crosstalk, and standardized FIR filters coupled between the lines.

As illustrated in FIG. 19, in a system that has numerous closely spaced signal lines S1, S2, S3 and S4, such as a bus for a computer or similar device, crosstalk may exist between each line and each nearby line. This crosstalk may have characteristics, based upon how many lines are between the crosstalk creator and the crosstalk victim, which can be equalized with an FIR having corresponding equalization characteristics, such as magnitude, timing and sign. Since these crosstalk characteristics have a regular pattern, crosstalk FIRs for each line may have a number of standard equalization drivers each designed to compensate for crosstalk a certain number of lines away. Thus self FIR 500, self FIR 502, self FIR 505 and self FIR 508 may each have equal ratios k which can be used to compensate for attenuation and reflections. Similarly XTK 510, XTK FIR 512, XTK FIR 515 and XTK FIR 518 may each have equal ratios k' that depend upon whether a line being equalized is a first adjacent line, second adjacent line, third adjacent line or further spaced from the crosstalk generating and equalizing line.

Figure 20:
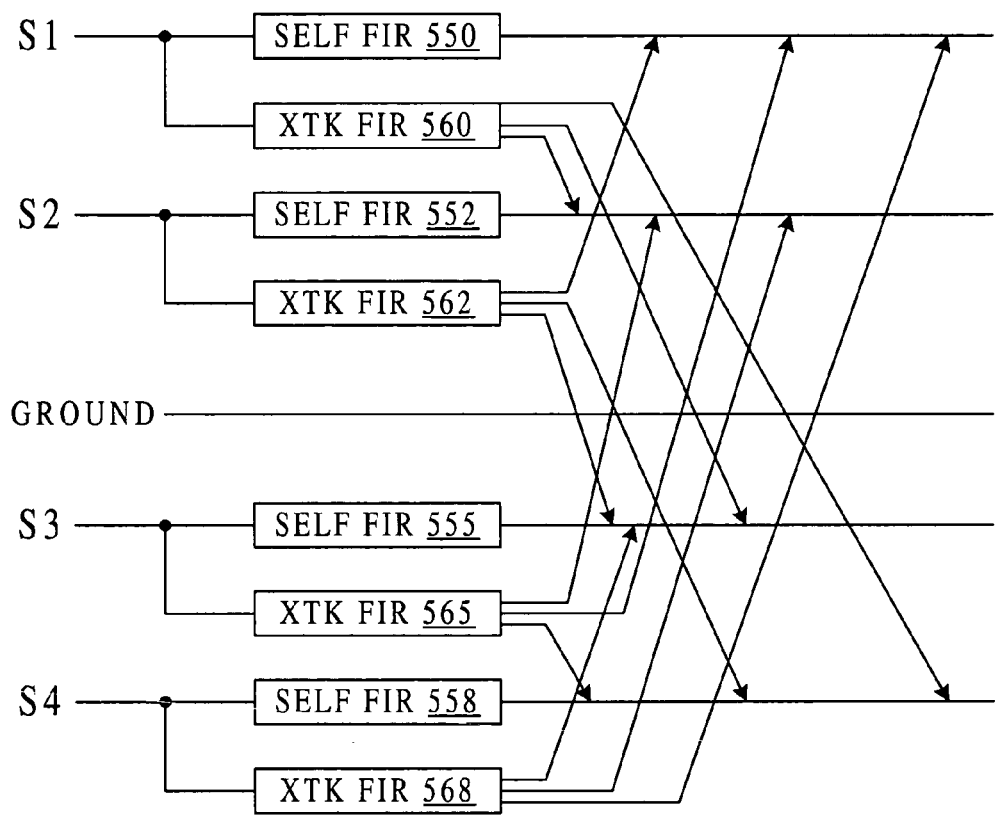
FIG. 20 shows a system with a number of adjacent signal lines grouped in pairs with a ground wire disposed between the pairs of lines and standardized FIR filters coupled between the lines.

As shown in FIG. 20 spaced signal lines S1, S2, S3 and S4 may be grouped in pairs or other arrangements, for example with a ground wire disposed between the pairs of lines. In this case, crosstalk equalization FIRs 560, 562, 565 and 568 may distinguish whether a signal line subjected to crosstalk from and adjacent signal line is spaced apart by a ground wire, and adjust the equalization parameters accordingly. Similarly, lines that are adjacent in one area, such as at signal pads for a circuit, may be separated in another area, for example due to routing in separate layers of a circuit board. In this situation, alternately spaced lines, such as S1 and S3, may induce more crosstalk in each other than adjacent lines, such as S1 and S2, and the equalization parameters may be adjusted accordingly.

Figure 21:
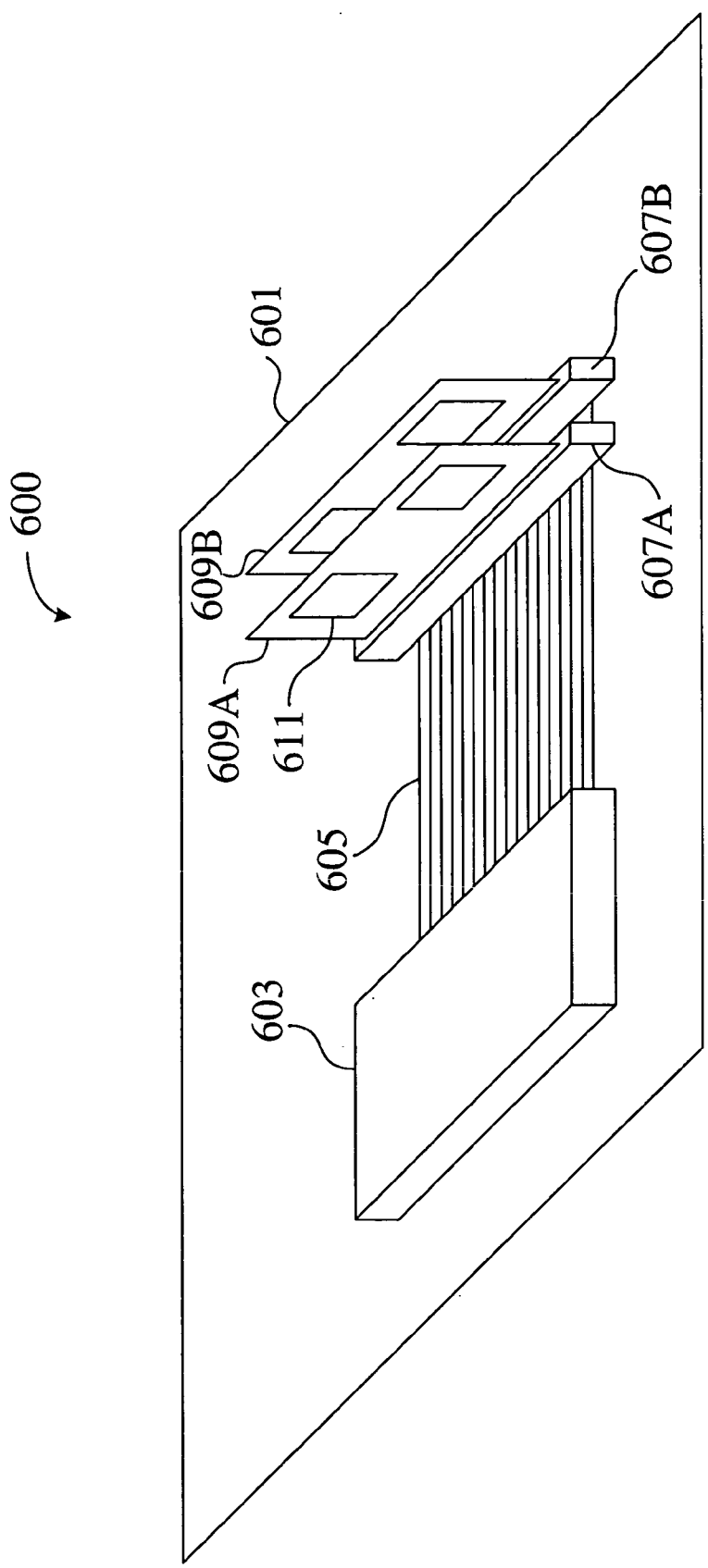
FIG. 21 illustrates a memory system in which embodiments of the present invention may be applied.

FIG. 21 illustrates a memory system 600 in which embodiments of the present invention may be applied. The system 600 includes a printed circuit board 601 (sometimes called a motherboard) to which a memory controller 603, a signaling path 605 and connectors 607A, 607B are affixed. Memory modules 609A, 609B, each containing one or more memory devices 611, are affixed to the printed circuit board 601 by being removably inserted into the connectors 607A, 607B. Though not shown in FIG. 21, the memory modules 609A, 609B include traces to couple the memory devices 611 to the signaling path 605 and ultimately to the memory controller 603.

In the embodiment of FIG. 21, the signaling path 605 constitutes a multi-drop bus that is coupled to each memory module. The individual memory devices of a given module may be coupled to the same set of signaling lines within signaling path 605, or each memory device of the module may be coupled to a respective subset of the signaling lines. In the latter case, two or more memory devices 611 on a module may be accessed simultaneously to read or write a data value that is wider (i.e., contains more bits) than the data interface of a single memory device. In an alternative embodiment (not shown), each of the memory modules may be coupled to the memory controller via a dedicated signaling path (i.e., a point-to-point connection rather than a multi-drop bus). In such an embodiment, each of the memory devices on the memory module may be coupled to a shared set of signaling lines of the dedicated path, or each memory device may be coupled to respective subsets of the signaling lines.

The signaling path 605 may include a single, multiplexed set of signal lines to transfer both data and control information between the memory controller 603 and memory devices 611. Alternatively, the signaling path 605 may include a set of signaling lines for transferring data between the memory devices 611 and the memory controller 603, and a separate set of signaling lines for transferring timing and control information between the memory devices 611 and the memory controller 603 (e.g., clock signals, read/write commands, and address information). Preferably the control information is uni-directional, flowing from the memory controller 603 to the memory devices 611, but status information may also be communicated from the memory devices 611 to the memory controller. Also, the timing information may be generated within the memory controller 611, or by external circuitry (not shown).

In one embodiment, selected signaling lines within signaling path 605 are used to carry multi-level signals (e.g., 4-PAM signals) between the memory devices 611 and the memory controller 603. For transfers from the memory controller 603 to a given memory device 611, a set of driver circuits within the memory controller 603 output multi-level signals onto the selected traces of the signaling path, with equalization and/or cross-talk cancellation being applied to each such signal as described above. Receiver circuits within the addressed memory device (or memory devices) receive the multi-level signals from the memory controller 603 and convert the signals into corresponding binary representations. Conversely, for transfers from the memory device 611 to memory controller 603 (e.g., in response to a read command issued to the memory device 611 by the memory controller 603), driver circuits within the memory device 611 output equalized and cross-talk-canceled multi-level signals onto the selected set of traces of the signaling path for receipt by receiver circuits within the memory controller 603. Such multi-level signaling may be used to transfer both data and control information between the memory controller 603 and the memory devices 611, or multi-level signaling may be used for one type of information transfer (e.g., data or control), but not the other. Further, the signaling technique used to transfer either data or control information (or both) may be dynamically switched between binary and multi-level signaling according to detected events, such as bandwidth demand, detection of a threshold error rate, and so forth.

Although a memory system that includes connectors for removable insertion of memory modules is depicted in FIG. 21, other system topologies may be used. For example, the memory devices need not be disposed on memory modules, but rather may be individually coupled to the printed circuit board 601. Also, the memory devices, the memory controller and the signaling path may all be included within a single integrated circuit along with other circuitry (e.g., graphics control circuitry, digital signal processing circuitry, general purpose processing circuitry, etc.). The system of FIG. 21 can be used in any number of electronic devices, including without limitation, computer systems, telephones, network devices (e.g., switch, router, interface card, etc.), handheld electronic devices, intelligent appliances.

Although we have focused on teaching the preferred embodiments of a low latency multi-line, multi-level equalized communication system, other embodiments and modifications of this invention will be apparent to persons of ordinary skill in the art in view of these teachings.

Therefore, this invention is limited only by the following claims, which include all such embodiments, modifications and equivalents when viewed in conjunction with the above specification and accompanying drawings.

The invention claimed is:

1. A communication system comprising:
a first printed circuit board;
a conductive path affixed to the printed circuit board;
a driver circuit affixed to the first printed circuit board and coupled to the conductive path to output onto the conductive path a signal having a voltage level that varies in time between at least three distinct levels representative of at least three distinct digital values, the driver circuit including an equalization circuit to adjust the voltage level of the signal output by the driver circuit at a first time according to a digital value represented by the signal at a previous time; and
a receiver circuit affixed to the first printed circuit board and coupled to receive the signal from the conductive path to determine which of the at least three distinct digital values is represented by the signal at a given time.

2. The system of claim 1, wherein the driver and receiver circuits are respective integrated circuits affixed to the first printed circuit board.

3. The system of claim 1, wherein the driver and receiver circuits and conductive path are incorporated within a common integrated circuit that is affixed to the first printed circuit board.

4. The system of claim 1, wherein at least one of the driver and receiver circuits is coupled to a second printed circuit board that is affixed to the first printed circuit board.

5. The system of claim 4, wherein the second printed circuit board is removably affixed to the first printed circuit board.

6. The system of claim 1, wherein the driver circuit receives a plurality of input signals, and the equalization circuit receives and delays said plurality of input signals.

7. The system of claim 1, wherein the driver circuit receives a plurality of input signals, and the equalization circuit receives and inverts said plurality of input signals.

8. The system of claim 1, wherein the equalization circuit compensates for attenuation of the signal in the conductive path.

9. The system of claim 1, wherein the equalization circuit compensates for reflection of the signal in the conductive path.

10. The system of claim 1, wherein the equalization circuit compensates for crosstalk generated by the signal in a second conductive path.

11. The system of claim 1, wherein said signal has a fourth voltage level that varies in time between at least three distinct levels, the fourth level representative of a fourth digital value that is distinct from the at least three distinct digital values.

12. A communication system comprising:
a main driver adapted to convert a plurality of binary input signals into a main signal that shifts over time between a plurality of signal levels representing respective ones of at least three logical states; and
an equalization mechanism containing an auxiliary driver adapted to receive said plurality of binary input signals and to generate an equalization signal, said equalization signal being combined with the main signal to form an output signal in which a respective transition between two different signal levels is overdriven by an amount depending on the two different signal levels.

13. The system of claim 12, wherein said equalization mechanism includes an element adapted to invert said input signals.

14. The system of claim 12, wherein said main driver and said auxiliary driver each include a current source, and said signal levels are voltages that are in a range between ground and a positive voltage.

15. The system of claim 12, wherein said equalization mechanism is configured to compensate for attenuation of said signal over a signal line.

16. The system of claim 12, wherein said equalization mechanism is configured to compensate for reflection of said signal over a signal line.

17. The system of claim 12, wherein said signal is transmitted over a first signal line and creates crosstalk in a second signal line, and said equalization mechanism is coupled between said first and second lines and configured to compensate for said crosstalk in said second line.

18. The system of claim 12, wherein the amount a respective transition in the output signal is overdriven is proportional to a transition magnitude of the respective transition.

19. The system of claim 12, wherein the auxiliary driver includes an element adapted to delay said plurality of binary input signals by a time substantially equal to a bit period.

20. The system of claim 12, wherein the auxiliary driver includes an element adapted to invert said plurality of binary input signals.

21. The system of claim 12, wherein the main driver includes a plurality of driver current sources controlled by respective ones of the plurality of binary input signals and the auxiliary driver includes a plurality of driver current sources controlled by respective ones of delayed and inverted versions of the plurality of binary input signals, a respective driver current source in the auxiliary driver having a gain that is a fraction of a gain of a corresponding driver current source in the main driver.

22. The system of claim 12, wherein output signal is transmitted on a first transmission line among a plurality of transmission lines, the system further comprising a first crosstalk equalization driver to receive inverted versions of the plurality of binary input signals and to output a first crosstalk equalization signal on a second transmission line adjacent the first transmission line.

23. The system of claim 22, further comprising a second crosstalk equalization driver to receive delayed versions of the plurality of binary input signals and to output a second crosstalk equalization signal that is combined with the first crosstalk equalization signal.

24. A communication system comprising:
a signaling device configured to produce a set of signal levels representing a set of at least three logical states, said device including a main driver adapted to convert a plurality of binary input signals into an output signal that shifts over time between said signal levels to shift between said at least three logical states; and
an equalization mechanism containing an auxiliary driver that is substantially proportional to said main driver, said equalization mechanism adapted to receive said plurality of binary input signals and generate a set of at least three equalization signals based on said plurality of binary input signals;
wherein for each of said signal levels, an activation level of said main driver and an activation level of said auxiliary driver sum to equal N.

25. A communication system comprising:
a signaling device configured to produce a set of signal levels representing a set of at least three logical states, said device including a main driver adapted to convert a plurality of binary input signals into an output signal that shifts over time between said signal levels to shift between said at least three logical states; and
an equalization mechanism containing an auxiliary driver that is substantially proportional to said main driver, said equalization mechanism adapted to receive said plurality of binary input signals and generate a set of at least three equalization signals based on said plurality of binary input signals;
wherein said equalization mechanism includes an element adapted to delay said input signals by a time substantially equal to a bit period.

26. A communication system comprising:
a first main driver adapted to receive a first plurality of input signals and to output on a first line a first signal that varies over time between N output levels based on said first plurality of input signals, and a second main driver adapted to receive a second plurality of input signals and to output on a second line a second signal that varies over time between N output levels based on said second plurality of input signals, said main drivers adapted to shift from a first of said signal levels to a second of said signal levels by a transition having N−1 possible values for each said first signal level, said transition being substantially equal to a multiple of a difference between adjacent signal levels, said signal levels representing a set of logical states; and
an equalization mechanism including a first auxiliary driver having a gain that is substantially proportional to and smaller than said first main driver, said equalization mechanism configured to receive said first plurality of input signals and to output on said second line a third signal, whereby said third signal compensates for crosstalk on said second line generated by said first signal.

27. The system of claim 26, wherein said main drivers and equalization mechanism each include a current source, and said signal levels are voltages that are in a range between ground and a positive voltage.

28. The system of claim 26, wherein said equalization mechanism further comprises a delay element and a second auxiliary driver having a gain that is substantially proportional to and smaller than said first main driver, said second auxiliary driver configured to receive said first plurality of input signals after delay by said delay element, and to output on said first line a fourth signal.

29. The system of claim 26, wherein said equalization mechanism further comprises an inversion element and a second auxiliary driver having a gain that is substantially proportional to and smaller than said first main driver, said second auxiliary driver configured to receive said first plurality of input signals after inversion by said inversion element, and to output on said first line a fourth signal.

* * * * *